US007832700B2

(12) United States Patent  (10) Patent No.: US 7,832,700 B2
Ciungan  (45) Date of Patent: Nov. 16, 2010

(54) MOUNTING SYSTEM WITH ADJUSTABLE MOVING CAPABILITIES

(75) Inventor: Marcel Ciungan, Arlington Heights, IL (US)

(73) Assignee: Peerless Industries, Inc., Aurora, IL (US)

( * ) Notice: Subject to any disclaimer, the term of this patent is extended or adjusted under 35 U.S.C. 154(b) by 513 days.

(21) Appl. No.: 11/890,087

(22) Filed: Aug. 3, 2007

(65) Prior Publication Data

US 2008/0035816 A1  Feb. 14, 2008

Related U.S. Application Data

(60) Provisional application No. 60/836,890, filed on Aug. 9, 2006.

(51) Int. Cl.
*A47H 1/10* (2006.01)
(52) U.S. Cl. .................. 248/324; 248/281.11; 248/919
(58) Field of Classification Search ................. 248/323, 248/324, 325, 280.11, 281.11, 282.1, 917, 248/918, 919, 920, 123.11, 123.2, 124.1; 16/368, 369; 361/679.21, 679.61, FOR. 104, 361/FOR. 105
See application file for complete search history.

(56) References Cited

U.S. PATENT DOCUMENTS

| | | | |
|---|---|---|---|
| 6,695,270 B1 * | 2/2004 | Smed | 248/274.1 |
| D488,708 S | 4/2004 | Lam et al. | |
| D496,367 S | 9/2004 | Pfister | |
| D505,858 S * | 6/2005 | O'Keene | D8/355 |
| 6,905,101 B1 | 6/2005 | Dittmer | |
| D507,477 S | 7/2005 | Pfister | |
| 7,028,961 B1 | 4/2006 | Dittmer et al. | |
| 7,048,242 B2 * | 5/2006 | Oddsen, Jr. | 248/280.11 |
| 7,152,836 B2 | 12/2006 | Pfister et al. | |
| 7,178,775 B2 | 2/2007 | Pfister et al. | |
| 7,243,892 B2 | 7/2007 | Pfister | |
| 7,246,780 B2 * | 7/2007 | Oddsen, Jr. | 248/282.1 |
| D558,560 S | 1/2008 | Ciungan | |
| D558,561 S | 1/2008 | Ciungan | |
| D558,562 S | 1/2008 | Ciungan et al. | |
| D558,563 S | 1/2008 | Ciungan | |
| D558,564 S | 1/2008 | Ciungan | |
| D559,087 S | 1/2008 | Ciungan | |
| D559,088 S | 1/2008 | Ciungan | |
| D562,113 S | 2/2008 | Ciungan et al. | |
| 7,380,760 B2 * | 6/2008 | Dittmer | 248/278.1 |
| 7,395,996 B2 | 7/2008 | Dittmer | |
| 7,438,269 B2 | 10/2008 | Pfister et al. | |
| 7,448,584 B2 * | 11/2008 | Chen et al. | 248/278.1 |

(Continued)

*Primary Examiner*—A. Joseph Wujciak, III
(74) *Attorney, Agent, or Firm*—Foley & Lardner LLP

(57) ABSTRACT

A mounting system for providing horizontal adjustment to a device mounted on the mounting system. At least one first articulating arm is rotatably connected to a carriage assembly, where the carriage assembly is slidably engaged with groove guide of a wall plate. The wall plate is mounted to a wall or other similar surface, while at least one second articulating arm is also rotatably connected to the at least one first articulating arm at one end. At the other end, the at least one second articulating arm is operatively connected to a tilt assembly for tilting a device connected to the tilt assembly. The mounting system provides easy horizontal adjustment via sliding the carriage assembly along the groove guide(s) and via rotating the at least first and second articulating arms.

14 Claims, 28 Drawing Sheets

U.S. PATENT DOCUMENTS

| | | |
|---|---|---|
| 7,487,943 B1 | 2/2009 | Gillespie |
| 7,513,469 B1 | 4/2009 | Ciungan |
| D605,185 S * | 12/2009 | Russell et al. .............. D14/239 |
| 2005/0127253 A1 * | 6/2005 | Kim ........................ 248/176.1 |
| 2005/0263659 A1 | 12/2005 | Pfister et al. |
| 2008/0151483 A1 | 6/2008 | Holbrook et al. |

* cited by examiner

FIG. 2c
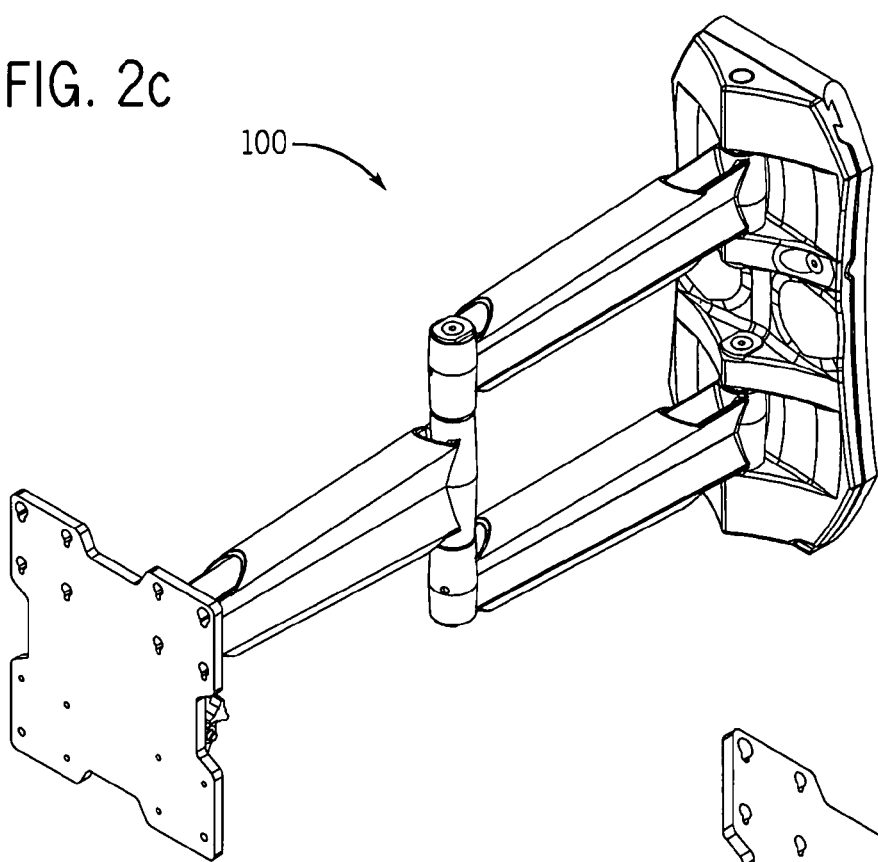
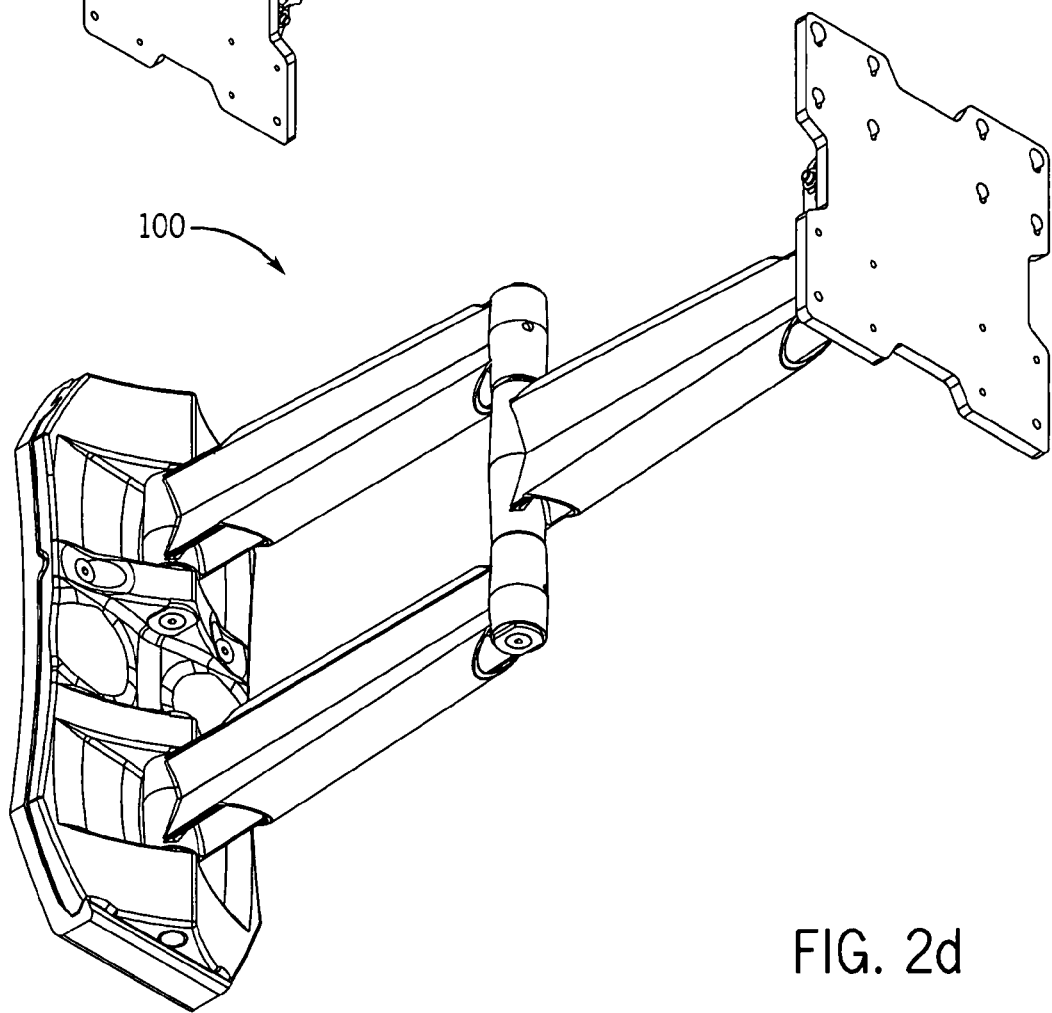
FIG. 2d

FIG. 3a
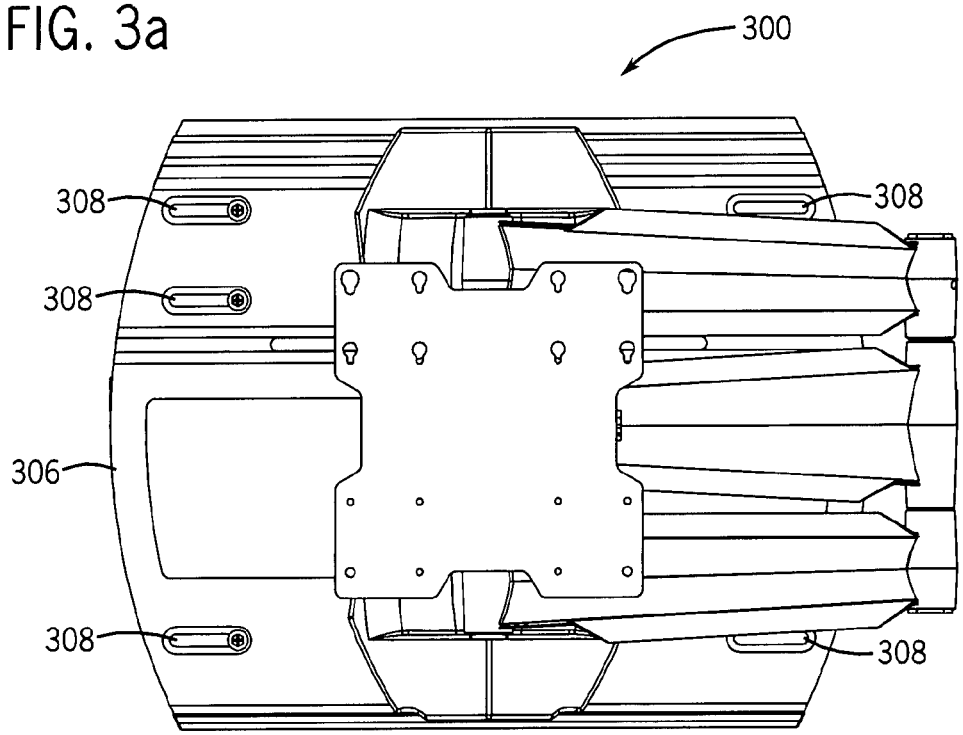
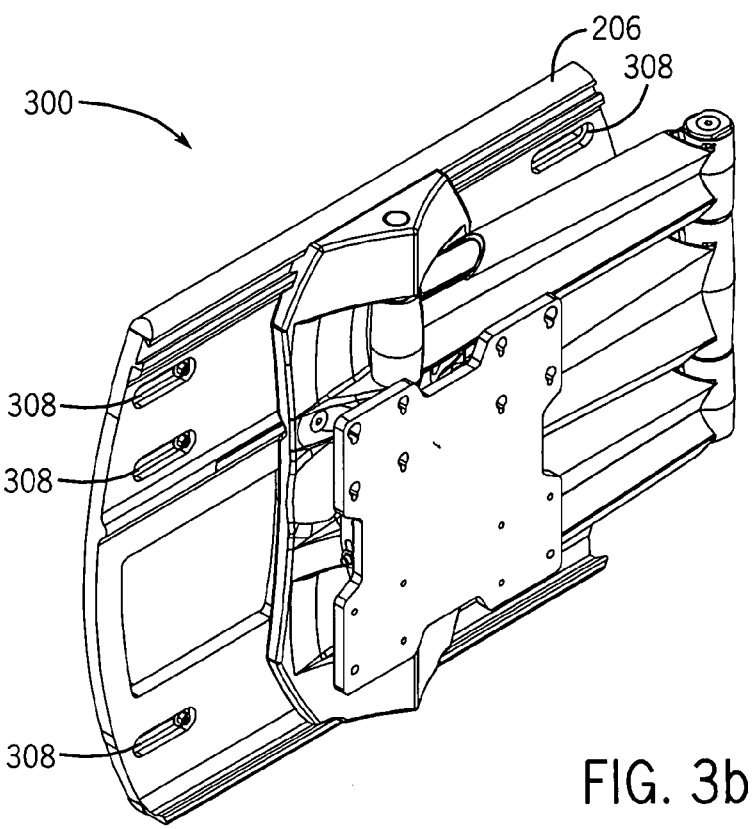
FIG. 3b

FIG. 3e
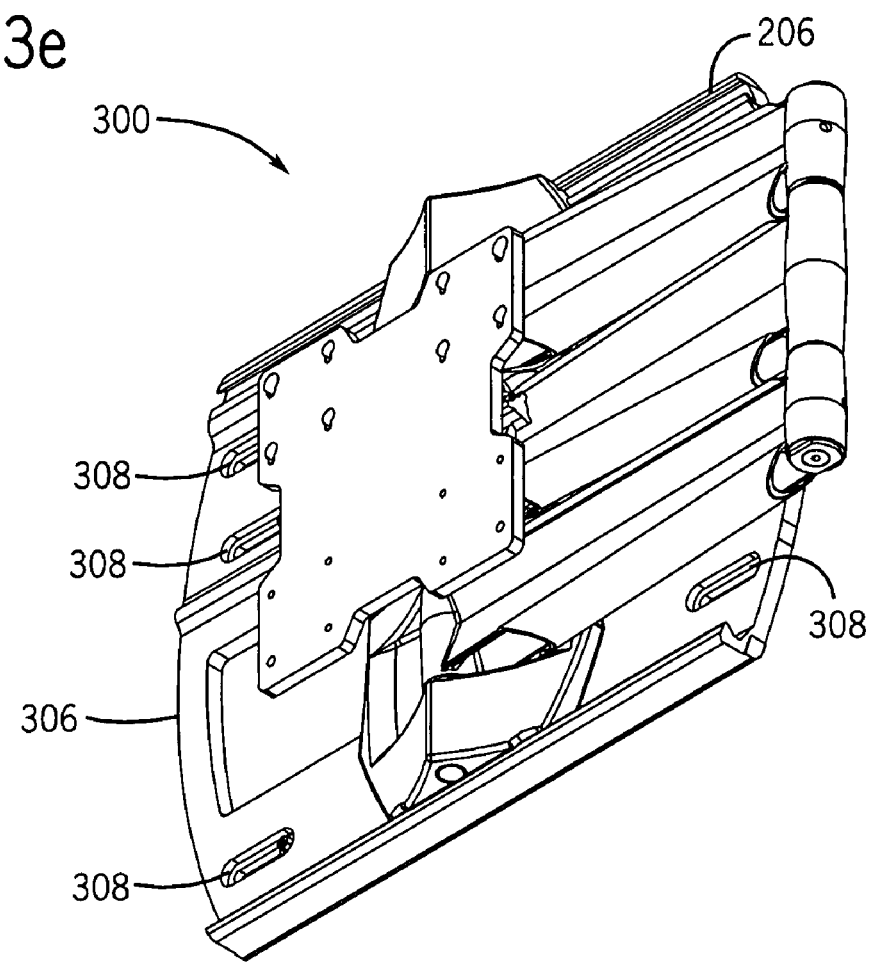
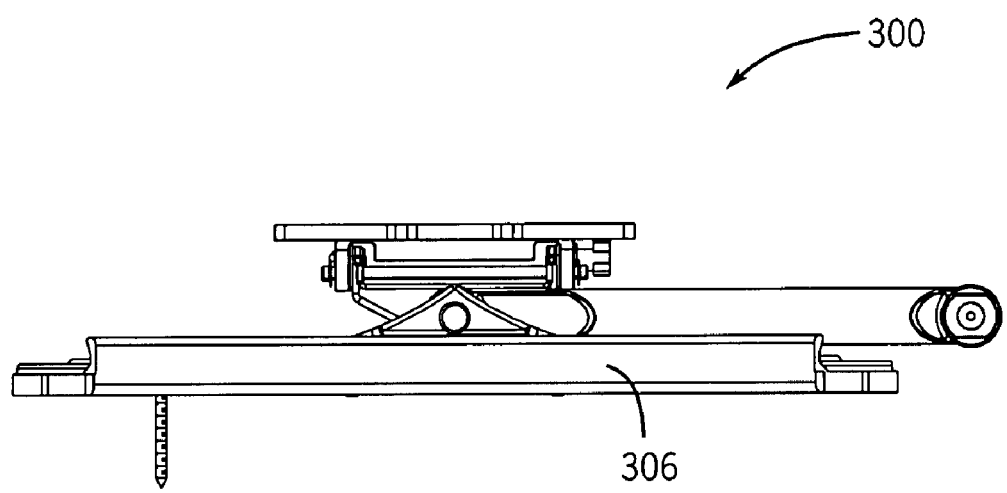
FIG. 3f

FIG. 3g
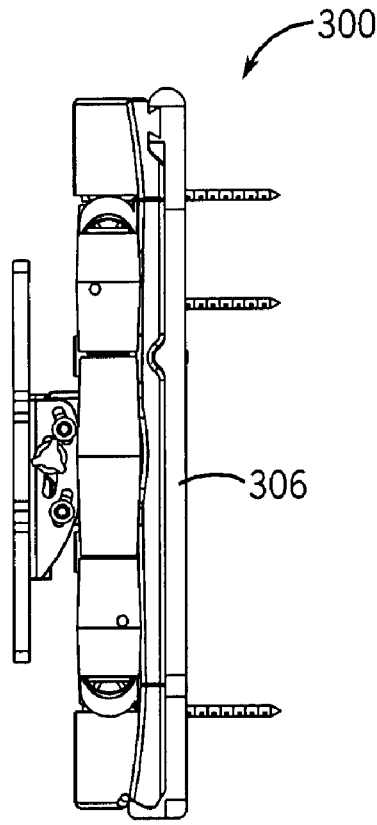
FIG. 3i
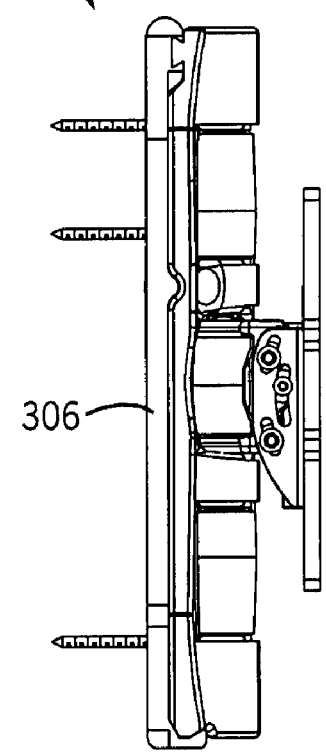
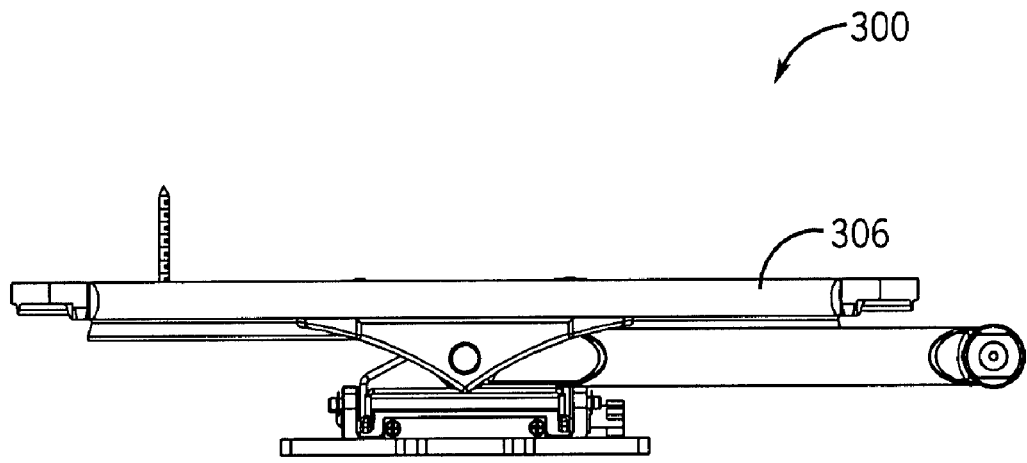
FIG. 3h

FIG. 4c
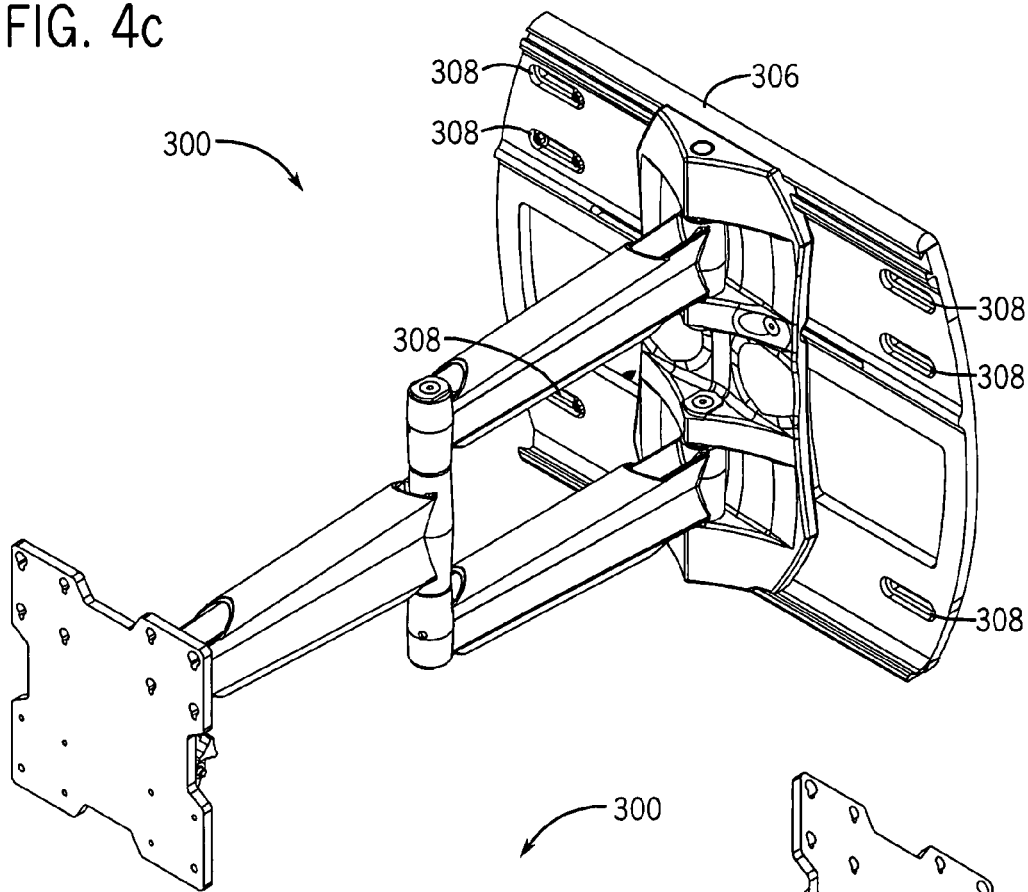
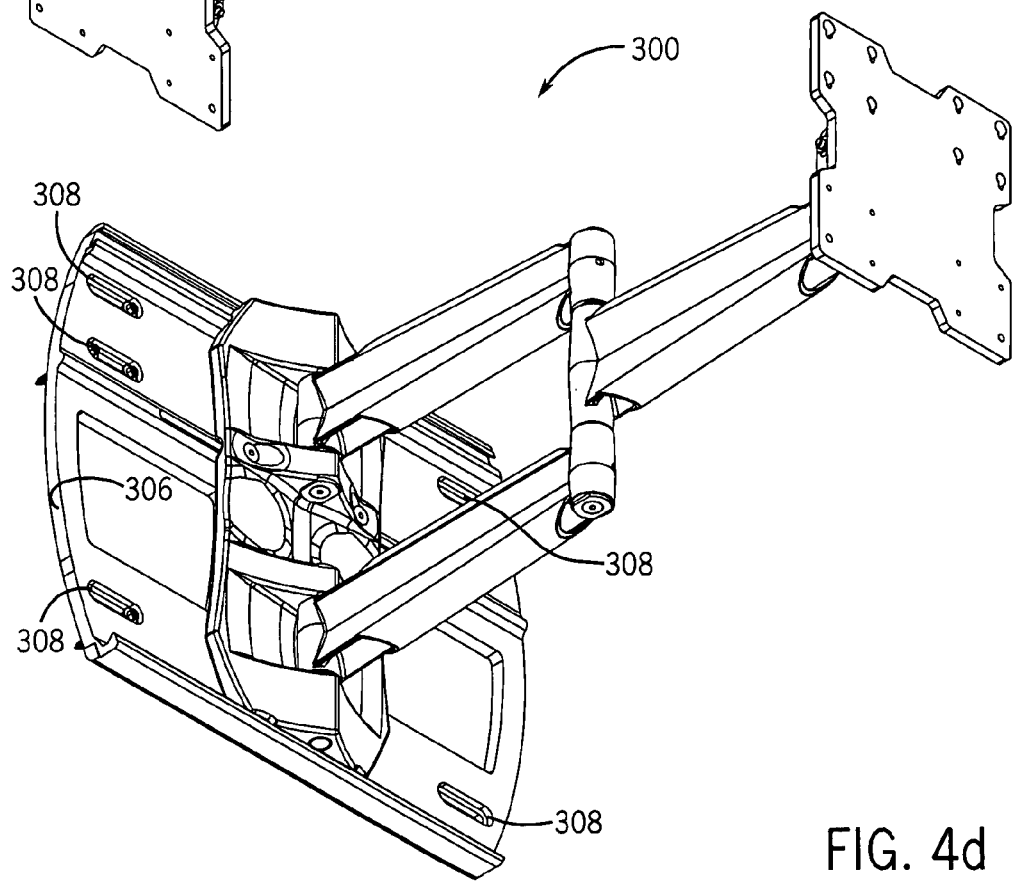
FIG. 4d

FIG. 5c
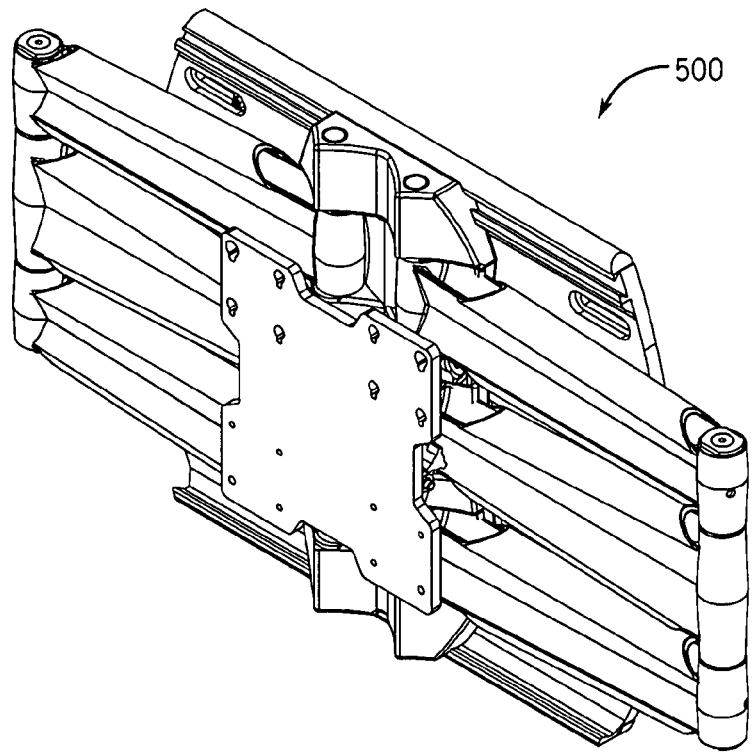
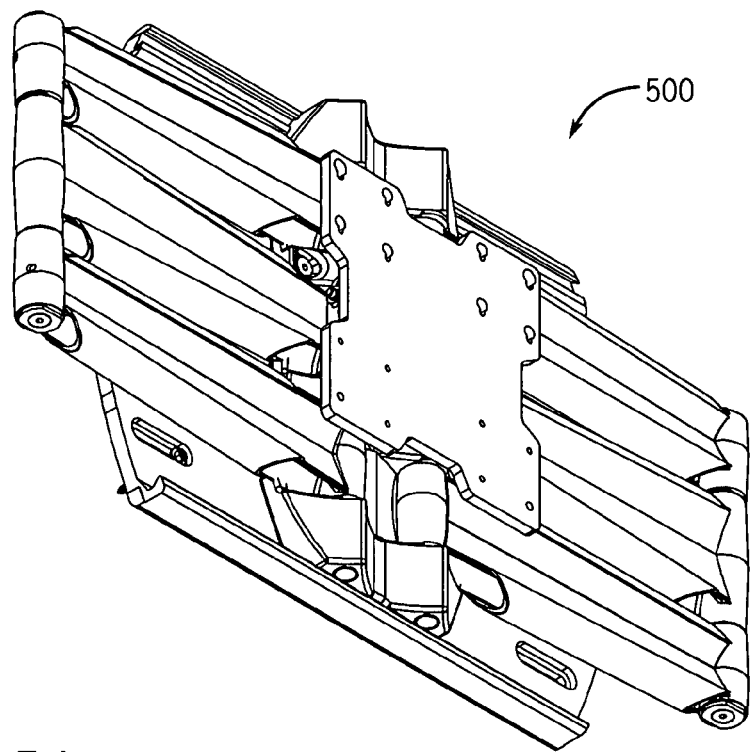
FIG. 5d

MOUNTING SYSTEM WITH ADJUSTABLE MOVING CAPABILITIES

CROSS-REFERENCE TO RELATED APPLICATIONS

The present application claims priority to U.S. Provisional Patent Application No. 60/836,890, filed Aug. 9, 2006 and incorporated herein by reference in its entirety.

FIELD OF THE INVENTION

The present invention relates generally to mounting systems. More particularly, the present invention relates to mounting systems for flat panel televisions with articulating arms, where the horizontal position of the television can be adjusted after installation.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, flat panel televisions have become enormously popular in both commercial and residential sectors. As the prices for plasma and liquid crystal display (LCD) flat panel displays have continued to fall, and the quality for the same devices have improved, more and more businesses and individuals have purchased such devices for both home and business entertainment purposes.

One of the advantages of flat panel television units that customers have found particular appealing is their relatively low thickness. Because conventional "tube" televisions have a relatively large depth, the display options for such devices are quite limited. In the residential setting, most users require a television stand or large entertainment center to store the television. Such stands or entertainment centers can take up significant floor space, which is often undesirable. In the commercial or educational setting, users will often install large overhead mounting systems that can contain the television. However these systems usually require professional installation and, once the television is secured to the mount, it is often difficult to access and adjust due to its height. With flat panel televisions, on the other hand, users are presented with a relatively new option: mounting the television directly to the wall. By mounting the television to the wall, a person can eliminate the need to take up potentially valuable floor space.

Although the introduction of flat panel televisions on a wide scale has presented new opportunities to both residential and commercial customers, it has also presented new challenges. In particular, flat panel televisions, while usually having significantly smaller depth or profile than conventional "tube" televisions, tend to be quite heavy. Particularly for flat panel televisions with large screens, this weight can become also prohibitively great. With such large weights involved, it is especially important that users can easily, safely, and securely mount the devices without having to make substantial adjustments. Furthermore, with such weights involved and the high cost of such devices, it is extremely important that the device be mounted correctly on the first attempt: if the device is not correctly mounted on the first try, there is a high risk of damaging the device and causing injury to those installing it.

With the above considerations in mind, there have been various attempts to develop mounting systems that address these concerns. Besides the flat wall mounts, there have been articulating arm mounts produced. This type in general allow a flat panel to be placed flat against the wall, or moved straight out away from the wall varying distances (mount dependant) and swing left or right, limited only by TV-to-wall contact. These articulating mounts add tremendous variety to flat panel television viewing including straight, or any variation of up to 90 degrees left or right of straight. Installations can also recess the flat panel television into a cabinet (with an articulating mount) flush with the outer wall surface. The articulating mount then allows the TV to come out of the recess and pivot left or right providing infinite additional viewing angles.

Flat panel televisions are ever increasing in size, and as they become less expensive, consumers are buying the largest they can afford. Flat panel televisions also conveniently provide twice the screen size of a "tube" unit, for a more enjoyable viewing experience. Customers are trying to fit the largest flat panel television into limited space: such as just above a fire place mantel, or in a corner up against the ceiling. These examples require a specific fine tuning of the vertical position of the television for the perfect installation effect, while still maintaining the television swivel left and right feature.

Some newer flat panel television mounts also include an articulating arm which permits the television to be moved away from a wall or other surface. One such single articulating arm mount is designed to primarily hold larger flat panel television units. Such a mount typically includes a welded wall bracket that is connected to the wall using fasteners such as wood screws. The wall bracket is connected to a set of articulating arms via metal tubing. The articulating arm is connected to a set of components that permit the flat panel television, when attached to the mount, to tilt, roll, and rotate relative to a wall or other mounting surface. This style of mount is used not only on a wall, but often is mounted on a recessed opening which is cut out of or built into the wall or mounting surface. In the application of the mount being positioned on a surface that is not recessed, the end user or installer may need to adjust the horizontal positioning of the television in order to obtain a preferred viewing location. In the case where the mount is installed within a recessed opening, the installer may need to adjust the horizontal position to account for any variance in the original positioning of the mount relative to the opening, or any displacement that may be natural to the mount itself.

SUMMARY OF THE INVENTION

Various embodiments of the present invention provide a horizontally adjustable mounting system for use with a variety of devices, especially display devices such as flat screen televisions. A single or multiple articulating arm(s) are used in the various embodiments of the present invention to provide the horizontal adjustment features. Additionally, a carriage assembly that slides into a groove-guide, formed into a wall plate for mounting the mounting system to a wall or similar surface can be used. A system of screws and flanged nuts, on the left and right sides of the block allows the block (and the mount through it) to be locked in desired positions along the wall plate. The friction in the pivoting joints of the articulating arms can be controlled thru the flat head screw torque. As the screws are tightened, flat washers are used to push against sliding bushings having a flange in contact with the articulating arms, creating the desired pressure on the contact surfaces. Furthermore, a tilting assembly based on a self balancing mechanism can provide adjustments to a device mounted on the mounting system.

The various embodiments of the present invention provide an installer of the mounting system with a convenient method of adjusting the mounting system. The arrangement of single or multiple articulating arms results in an accessible point of adjustment. In addition, the configuration of single or multiple articulating arms is able to more easily support devices mounted on the mounting system.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 2c is a second extended perspective view of a mounting system constructed in accordance with a first embodiment of the present invention;

FIG. 2d is a third extended perspective view of a mounting system constructed in accordance with a first embodiment of the present invention;

FIG. 3a is a collapsed frontal view of a mounting system constructed in accordance with a second embodiment of the present invention;

FIG. 3b is a first collapsed perspective view of a mounting system constructed in accordance with a second embodiment of the present invention;

FIG. 3e is a fourth collapsed perspective view of a mounting system constructed in accordance with a second embodiment of the present invention;

FIG. 3f is a collapsed bottom view of a mounting system constructed in accordance with a second embodiment of the present invention;

FIG. 3g is a first collapsed side view of a mounting system constructed in accordance with a second embodiment of the present invention;

FIG. 3h is a collapsed top view of a mounting system constructed in accordance with a second embodiment of the present invention;

FIG. 3i is a second collapsed side view of a mounting system constructed in accordance with a second embodiment of the present invention;

FIG. 4c is a second extended perspective view of a mounting system constructed in accordance with a second embodiment of the present invention;

FIG. 4d is a third extended perspective view of a mounting system constructed in accordance with a second embodiment of the present invention;

FIG. 5c is a second collapsed perspective view of a mounting system constructed in accordance with a third embodiment of the present invention;

FIG. 5d is a third collapsed perspective view of a mounting system constructed in accordance with a third embodiment of the present invention;

DETAILED DESCRIPTION OF THE PREFERRED EMBODIMENTS

Figure 1A:
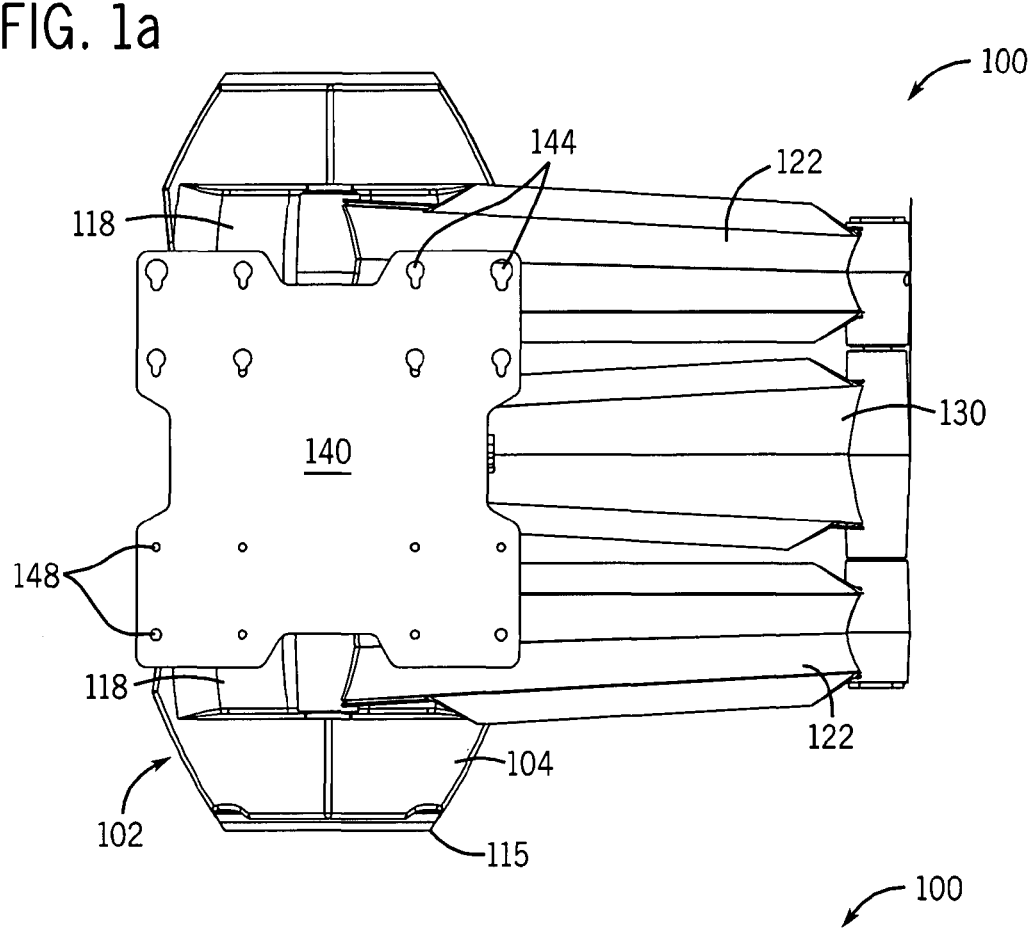
FIG. 1a is a collapsed frontal view of a mounting system constructed in accordance with one embodiment of the present invention.
Figure 1B:
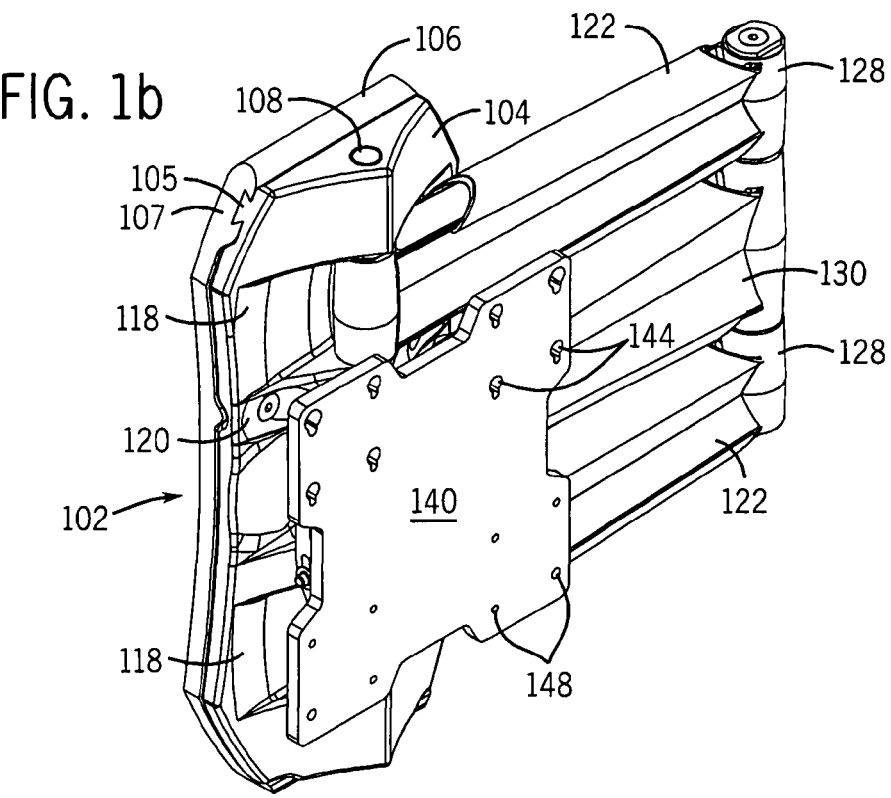
FIG. 1b is a first collapsed perspective view of a mounting system constructed in accordance with a first embodiment of the present invention.
Figure 1C:
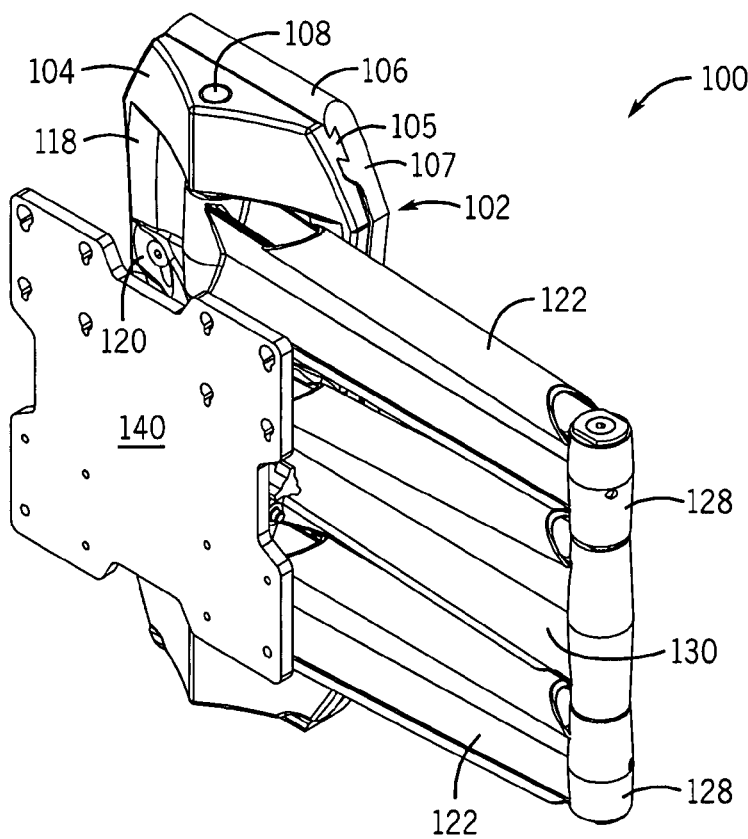
FIG. 1c is a second collapsed perspective view of a mounting system constructed in accordance with a first embodiment of the present invention.
Figure 1D:
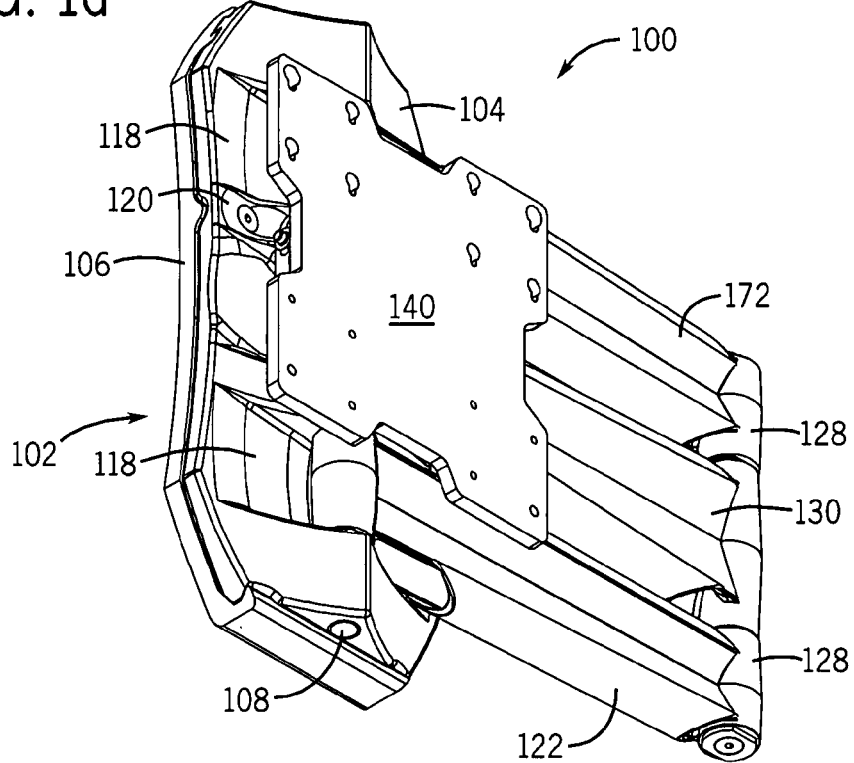
FIG. 1d is a third collapsed perspective view of a mounting system constructed in accordance with a first embodiment of the present invention.
Figure 1E:
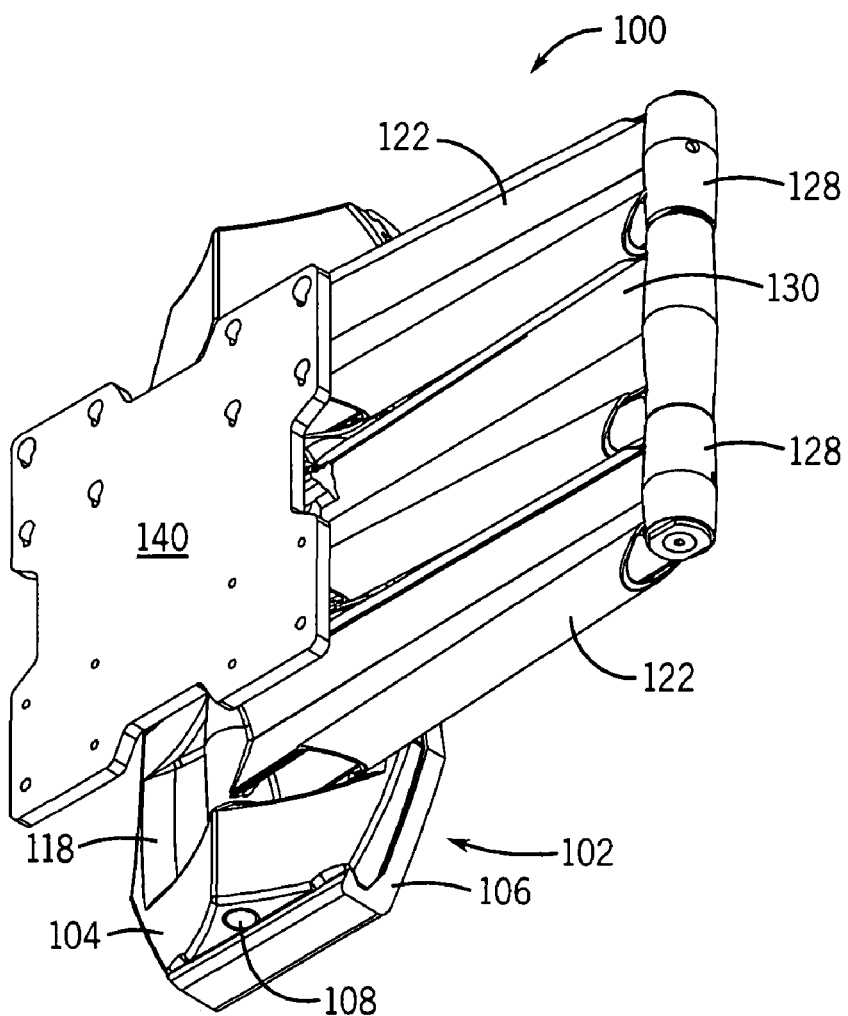
FIG. 1e is a fourth collapsed perspective view of a mounting system constructed in accordance with a first embodiment of the present invention.
Figure 1F:
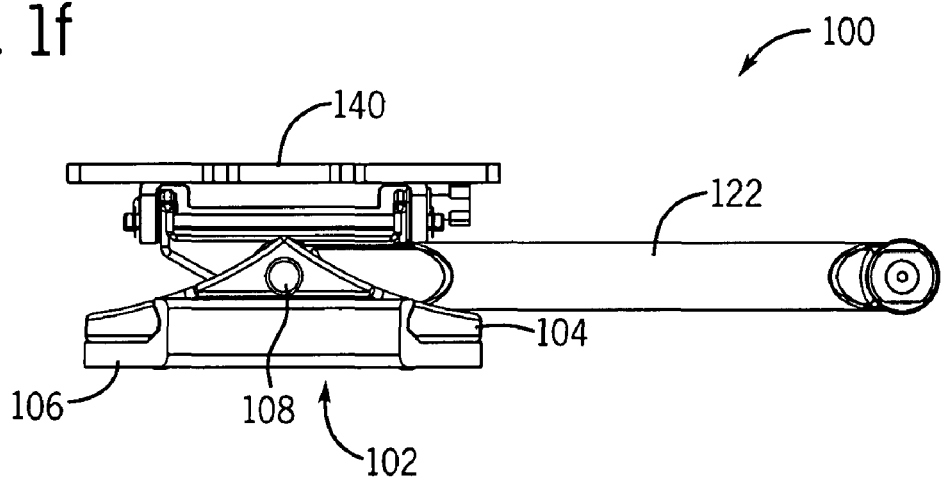
FIG. 1f is a collapsed bottom view of a mounting system constructed in accordance with a first embodiment of the present invention.
Figure 1G:
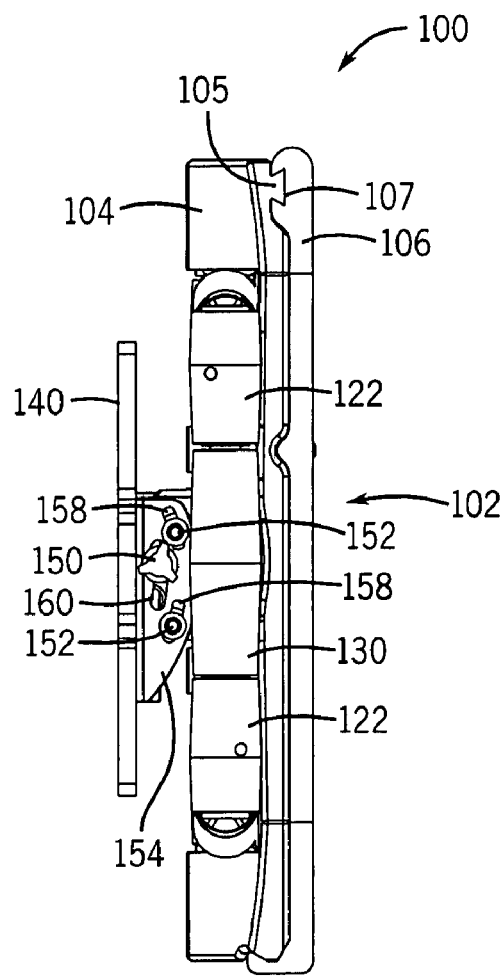
FIG. 1g is a first collapsed side view of a mounting system constructed in accordance with a first embodiment of the present invention.
Figure 1I:
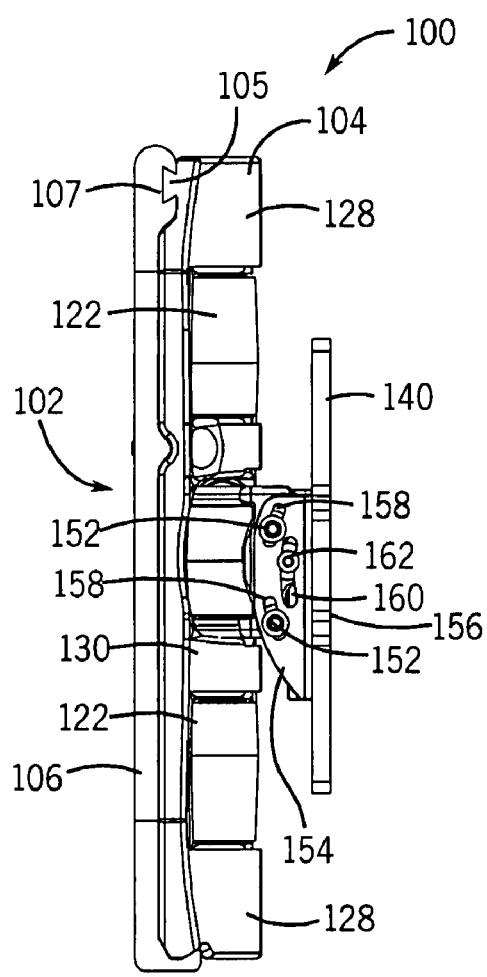
FIG. 1i is a second collapsed side view of a mounting system constructed in accordance with a first embodiment of the present invention.
Figure 1H:
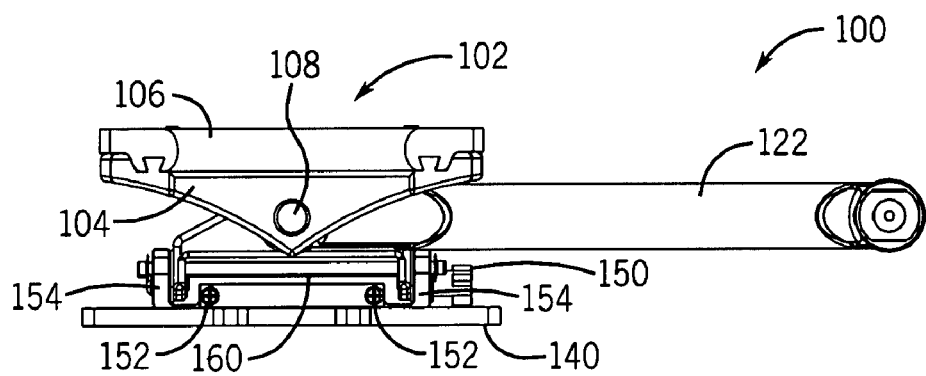
FIG. 1h is a collapsed top view of a mounting system constructed in accordance with a first embodiment of the present invention.
Figure 1J:
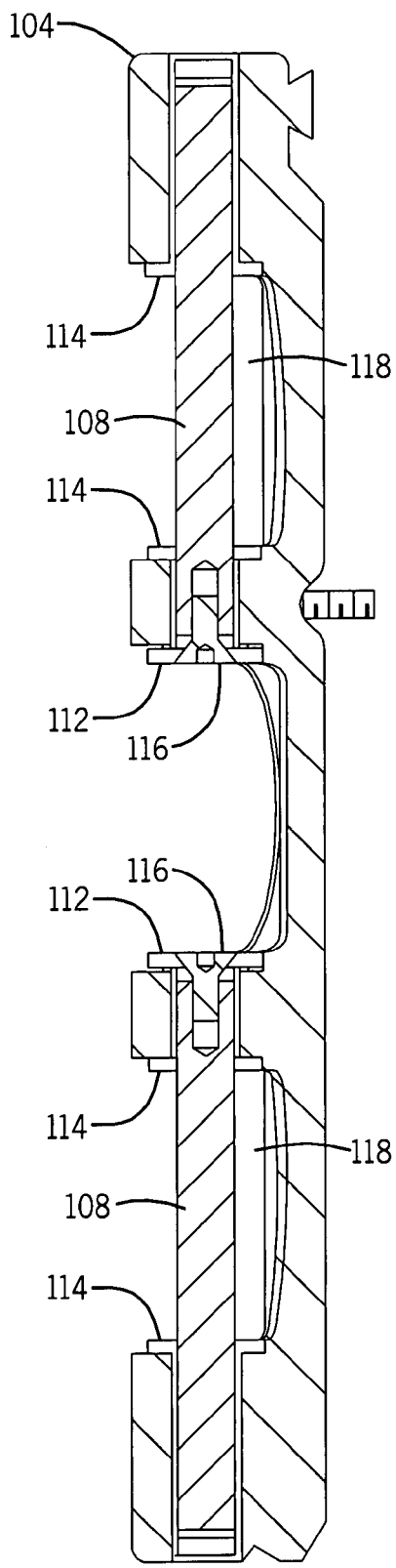
FIG. 1j is a cross-sectional view of a carriage assembly utilized in various embodiments of the present invention.
Figure 1K:
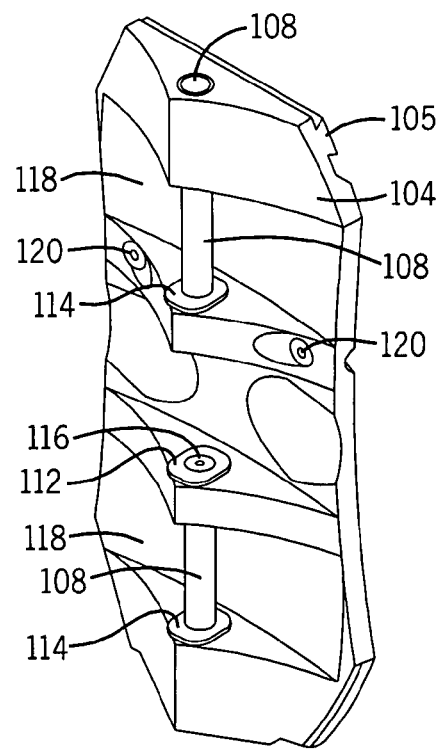
FIG. 1k is a perspective view of a carriage assembly utilized in various embodiments of the present invention.
Figure 2A:
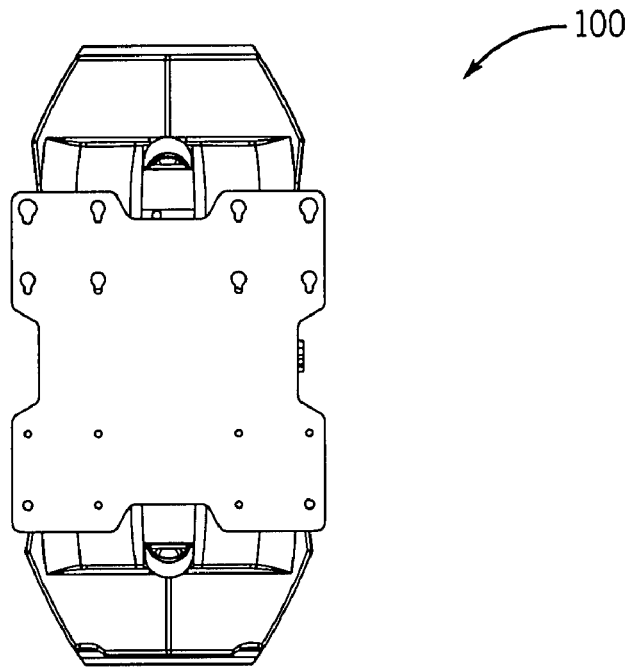
FIG. 2a is an expanded frontal view of a mounting system constructed in accordance with a first embodiment of the present invention.
Figure 2B:
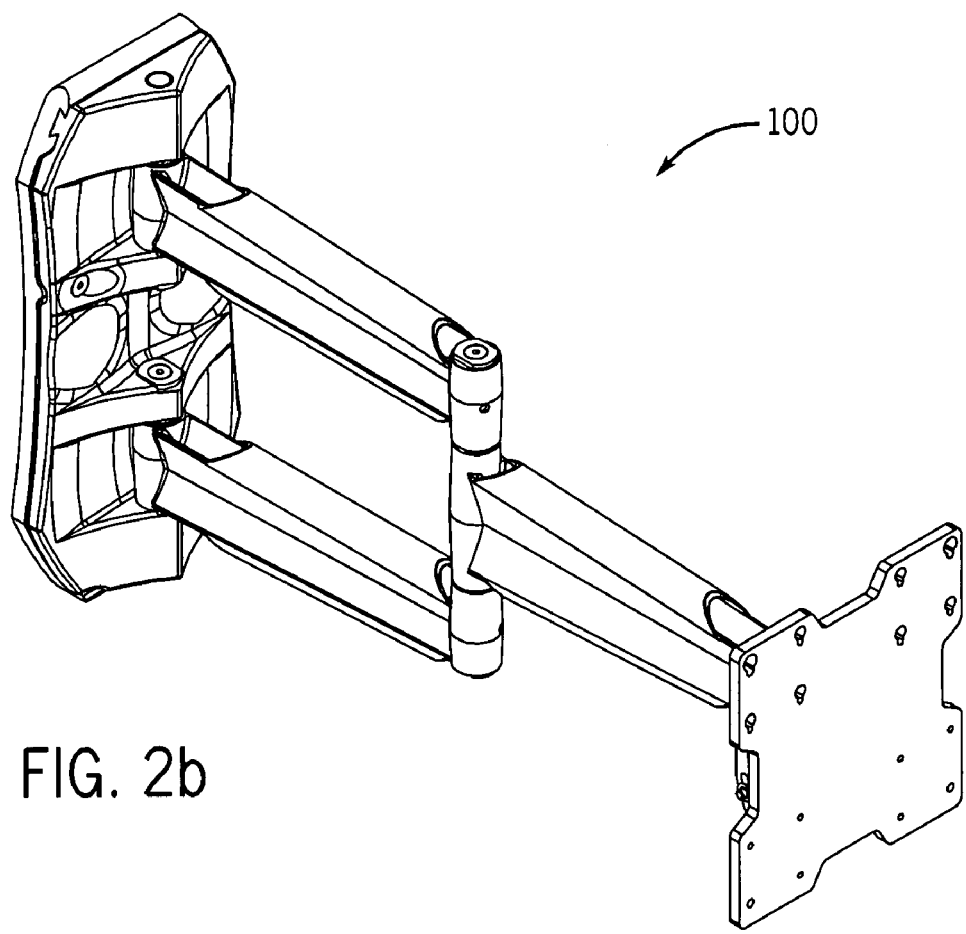
FIG. 2b is a first expanded perspective view of a mounting system constructed in accordance with a first embodiment of the present invention.
Figure 2E:
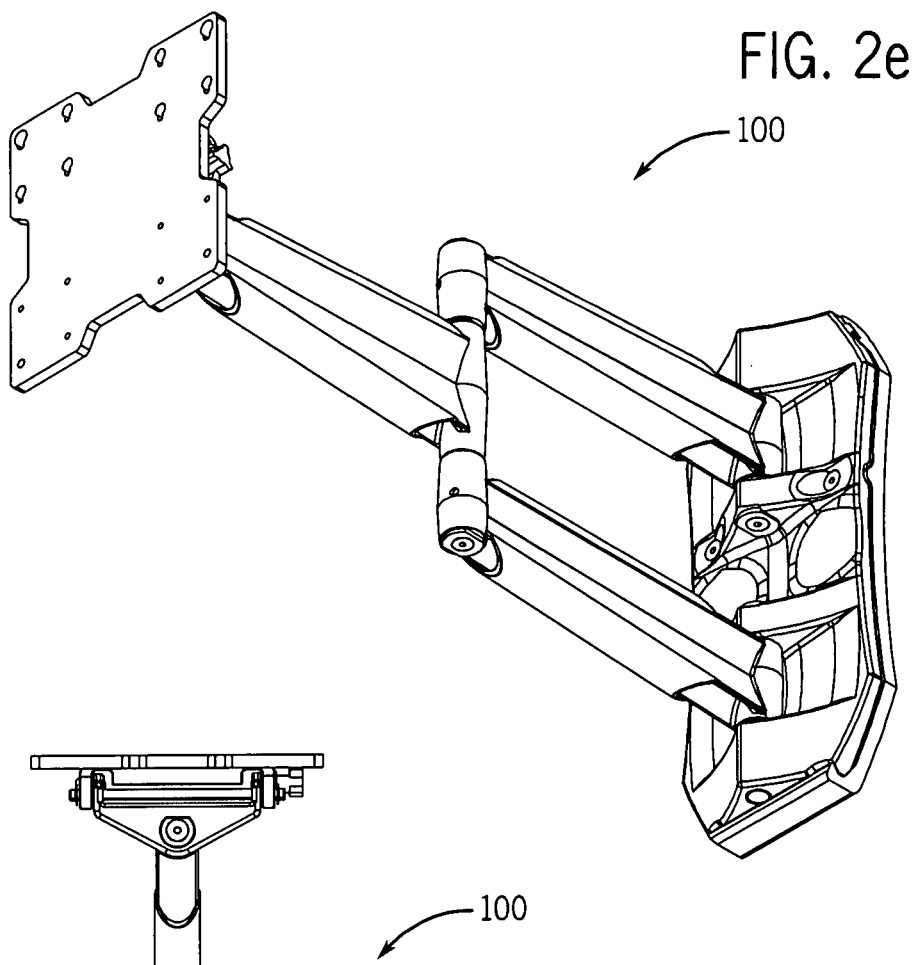
FIG. 2e is a fourth extended perspective view of a mounting system constructed in accordance with a first embodiment of the present invention.
Figure 2F:
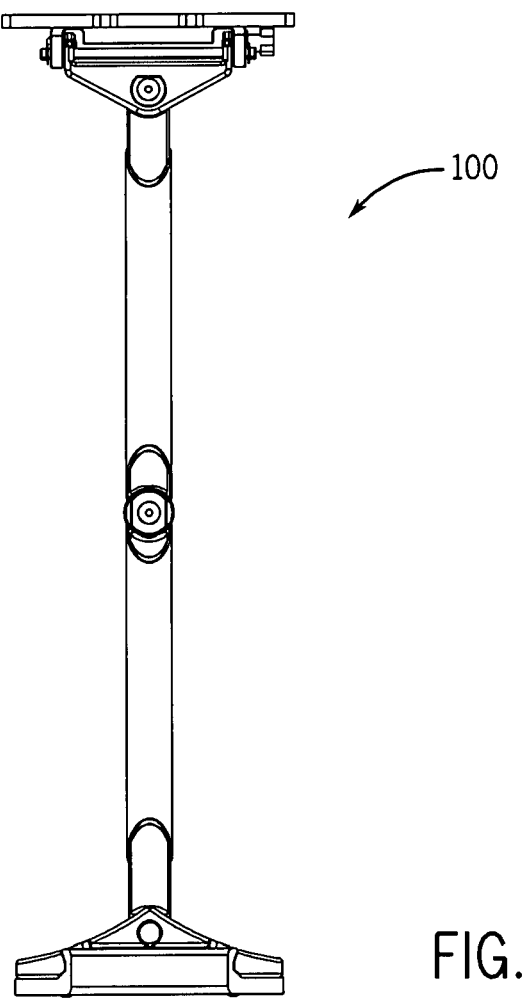
FIG. 2f is an extended bottom view of a mounting system constructed in accordance with a first embodiment of the present invention.
Figure 2G:
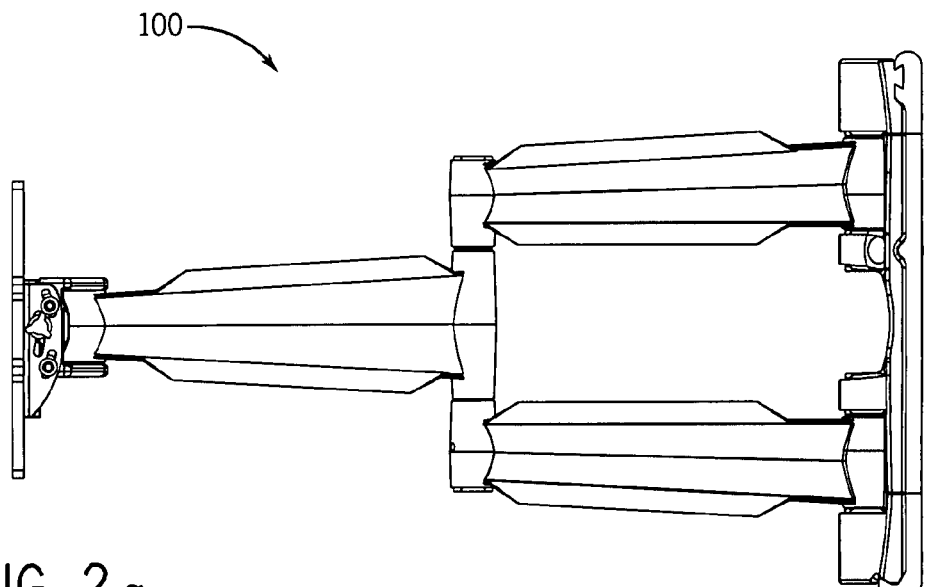
FIG. 2g is a first expanded side view of a mounting system constructed in accordance with a first embodiment of the present invention.
Figure 2H:
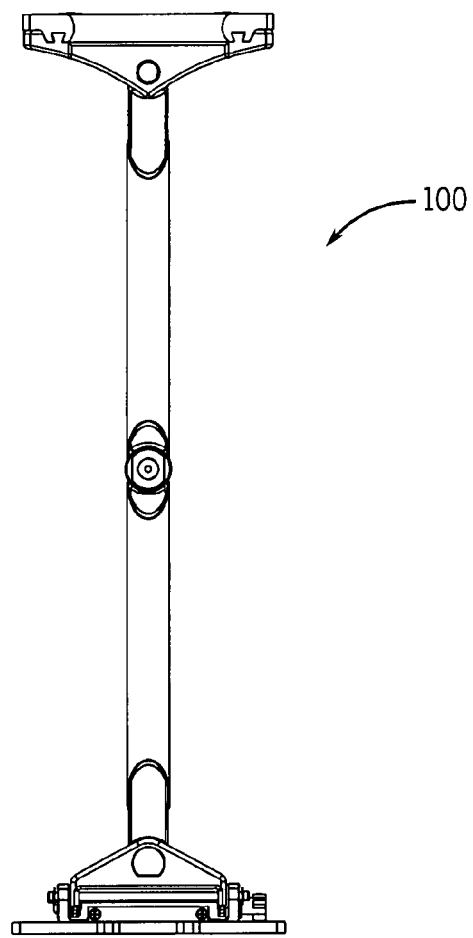
FIG. 2h is an expanded top view of a mounting system constructed in accordance with a first embodiment of the present invention.
Figure 2I:
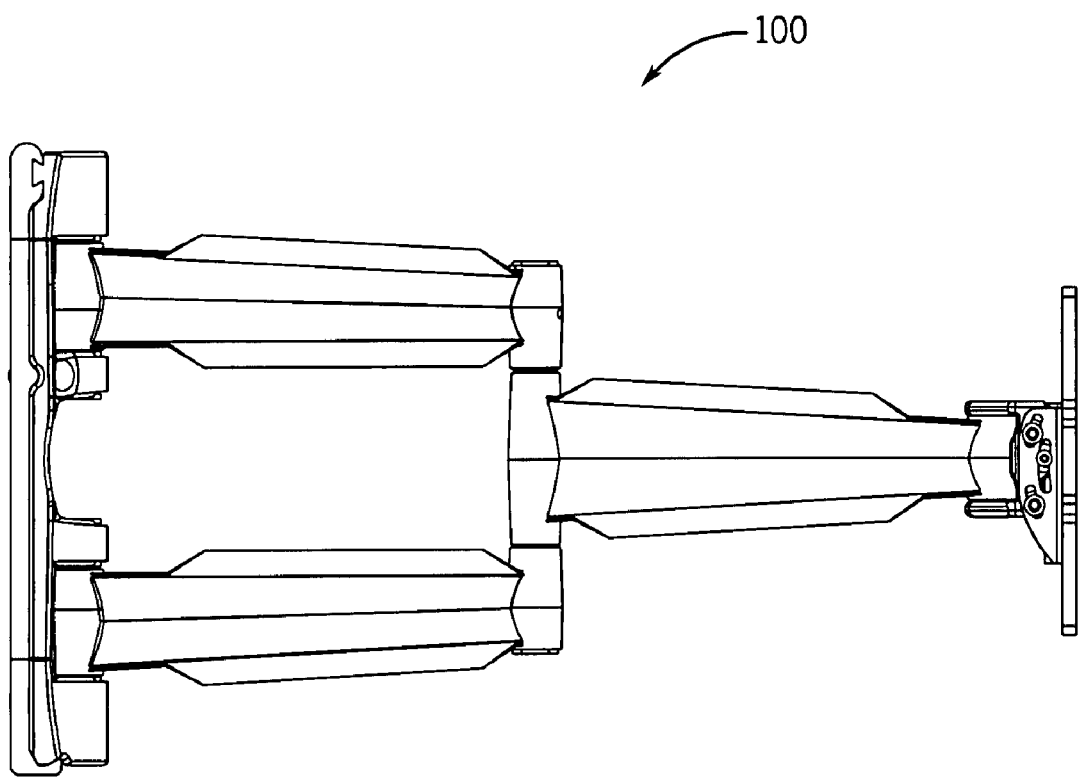
FIG. 2i is a second expanded side view of a mounting system constructed in accordance with a first embodiment of the present invention.

FIGS. 1a-2i show a mounting system 100 constructed in accordance with a first embodiment of the present invention. The mounting system 100 includes a carriage assembly 102, the carriage assembly 102 comprising a sliding block 104 and a wall plate 106. The sliding block 104 has a dovetail portion 105 that slidingly engages a dovetail profile groove guide 107 formed in the wall plate 106, allowing the sliding block 104 to horizontally move along the dovetail profile groove guide 107. The wall plate 106 can be affixed to a wall or other desired surface via a plurality of slots (not shown) for accepting bolts, screws, or other affixing devices. It should be noted that in various embodiment of the present invention, the plurality of slots are substantially horizontally spaced commensurate with standard wall stud spacing for security purposes. Additionally, in various embodiments of the present invention, each of the plurality of slots is a substantially horizontally elongated slot to allow for variations that can be experienced with the standard wall stud spacing.

The sliding block 104 further comprises a plurality of screw assemblies 120 located on the left and right sides of the sliding block 104, each screw assembly 120 including a screw and various flanged nuts or bolts. The screw assemblies 120 allow the sliding block 104 to be locked after being slid to a desired position along the dovetail profile groove guide 107 of the wall plate 106. The sliding block 104 also comprises two axles 108, each held in place by screws 116 allowing wall arms 122 to be rotatably affixed to the sliding block 104. The wall arms 122 comprise substantially hollow portions 128 for accepting the axles 108, the hollow portions 128 and the axles 108 being the axis around which the wall arms 122 rotate. Additionally, the sliding block 104 has formed therein at least 2 channels 118 providing space to allow the substantially hollow portions 128 to rotate freely. Furthermore, the channels 118 allow the wall arms 122 to rest as close to the carriage assembly 102 and/or wall or surface, the carriage assembly 102 is mounted to. It should be noted that the range of movement of the wall arms 122 as shown in the embodiments illustrated in FIGS. 1a-2i is limited to 180 degrees, i.e., completely from the left to right sides of the sliding block 104, as the wall plate 106 and the sliding block 104 are likely to be mounted to a substantially planar surface, such as a wall. However, if the wall plate is configured to, for example, "wrap" around a corner portion of a wall, a greater degree of rotation can be realized.

As described above, at a first end, the wall arms 122 are connected via their respective substantially hollow portions 128 to the sliding block 104. At a second end distal from the first end, the wall arms 122 are connected via another axle 126. The axle 126 is utilized to allow a first arm 130 to be rotatably connected to, and between, the wall arms 122. The first arm 130 is in turn, connected to a tilt assembly 140, which can directly or indirectly (e.g., via an adapter plate (not shown)) connect to a display device (not shown). In a preferred embodiment of the present invention, the mounting system 100 is configured to support a flat panel television. However, other types of devices could also be mounted on the mounting system, 100. It should be noted that locating the first arm 130 between the wall arms 122 provides for a stronger and more stable mounting system 100. The weight of a display device is distributed between the two wall arms 122, resulting in less stress to any single arm.

Referring to the adapter plate, a quick disconnect/connect feature is created between the adapter plate and the tilt assembly 140. A "mushroom head" (not shown) is utilized on the back of the adapter plate, where the mushroom head slides into a pocketed external bracket of the tilt assembly 140. Specifically, the mushroom head slides through a u-shaped groove and is locked in a desired position by a sliding block located at the top of the external bracket. Additionally, standardized patterns comprised of threaded inserts are commonly located on the rear sides of flat screen display devices. An adapter plate can include a plurality of protrusions such as screws, for mating with the threaded inserts, allowing the adapter plate to be secured to the flat screen display device. The adapter plate and flat screen display device can then be attached to the tilt assembly 140 as described above. Furthermore, the flat screen display device can be oriented in either a portrait or landscape mode depending on how the adapter plate is attached to the tilt assembly 140, or by adjusting the orientation of the flat screen display device relative to the adapter plate. When adjusting the orientation of the flat screen display relative to the adapter plate, one embodiment of the present invention allows for the removal of only certain screws, re-orienting the flat screen display device, and re-screwing the removed screws. This provides a more efficient method of re-orientation than completely removing the adapter plate from the rear side of the flat screen display device.

It should be noted that the pivots/pivoting joints described above employ frictional forces to maintain the rotational, horizontal, and vertical (described below) positions of the sliding block 104, the wall arms 122, the first arm 130, and the tilt assembly 140 relative to each other. This can be seen in FIGS. 2*a*-2*i*, where the mounting system 100 is shown in a fully extended state. For example and as discussed above, the sliding block 104 utilizes screw assemblies 120 to lock itself into desired positions along the wall plate 106. In the case of the wall arms 122, a flat head screw is used in the screw assembly 120, where tightening the flat head screw forces a substantially flat double shaped washer to push against a sliding bushing which has a flange that contacts one of the wall arms 122. This creates the desired pressure on the contact surfaces to hold a position of the wall arms 122 relative to the sliding block 104.

Referring back to the tilt assembly 140, the tilt assembly comprises two brackets 154, each of the two brackets 154 having at least two substantially straight slots 158 in one embodiment of the present invention. In this embodiment, the tilt assembly 140 comprises two rods 152, each passing through the substantially straight slots 158 of each of the two brackets 154, resulting in operatively connecting the two brackets 154 in substantially parallel alignment. Furthermore, the tilt assembly 140 includes at least one friction slot 160 formed in each of the two brackets 154 through which a screw (not shown) is routed. The screw is held in place within the friction slot 160 with a floating nut 162 at one of the two brackets 154 and an adjustable knob 150 at the other of the two brackets 154. As described above, flat and/or flanged bushings are used between the moving parts of the tilt assembly 140 as spacers and to provide the desired friction needed to maintain a desired tilt position.

It should be noted that the various embodiments of the present invention employ a cord management system that comprise a plurality of covers that snap and/or slide in grooves formed into the wall arms 122 and the first arm 130. Such a configuration allows cords from a display device to be almost completely hidden within the mounting system 100. Although the various embodiments of the present invention utilize a cast aluminum and low carbon steel alloy to form various components of the mounting system 100, other appropriate materials may also be used. And although various embodiment of the present invention utilize screw assemblies to effect proper attachment and friction adjustment of the various components of the mounting system 100, other appropriate assemblies such as locking fasteners, pins, stand-offs, and other similar components may be used to the same effect.

Figure 3C:
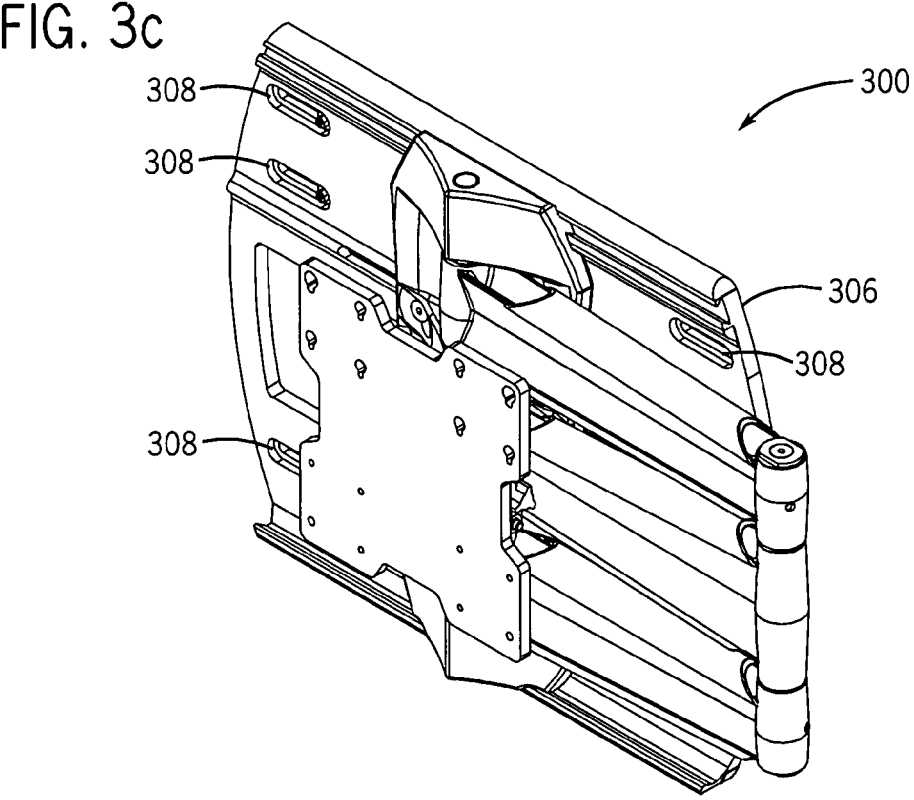
FIG. 3c is a second collapsed perspective view of a mounting system constructed in accordance with a second embodiment of the present invention.
Figure 3D:
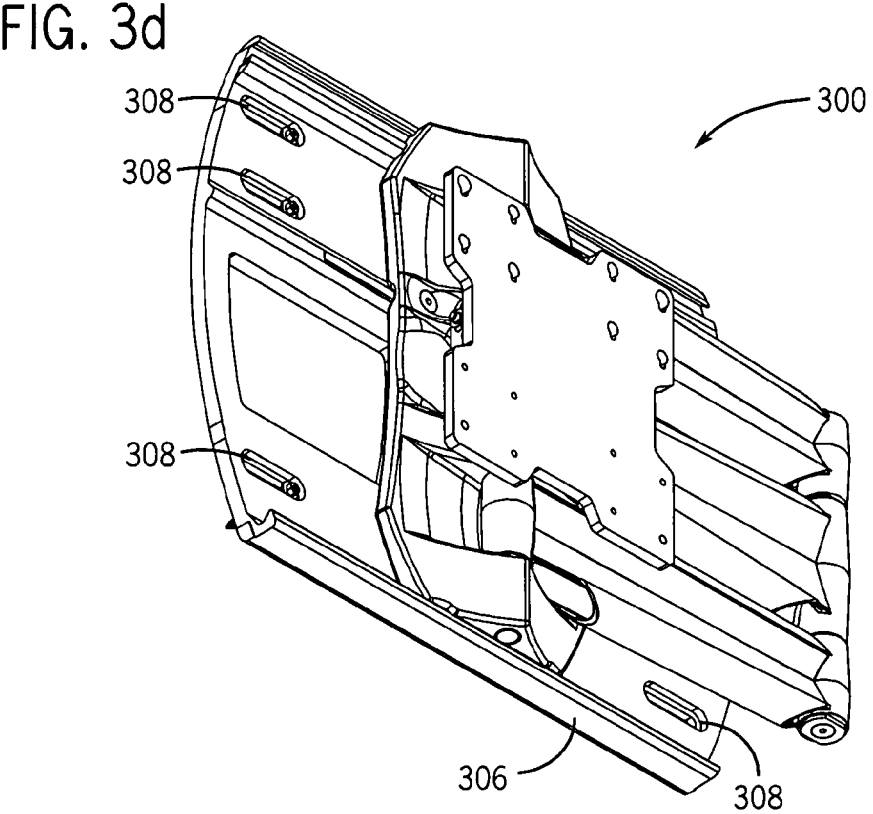
FIG. 3d is a third collapsed perspective view of a mounting system constructed in accordance with a second embodiment of the present invention.
Figure 4A:
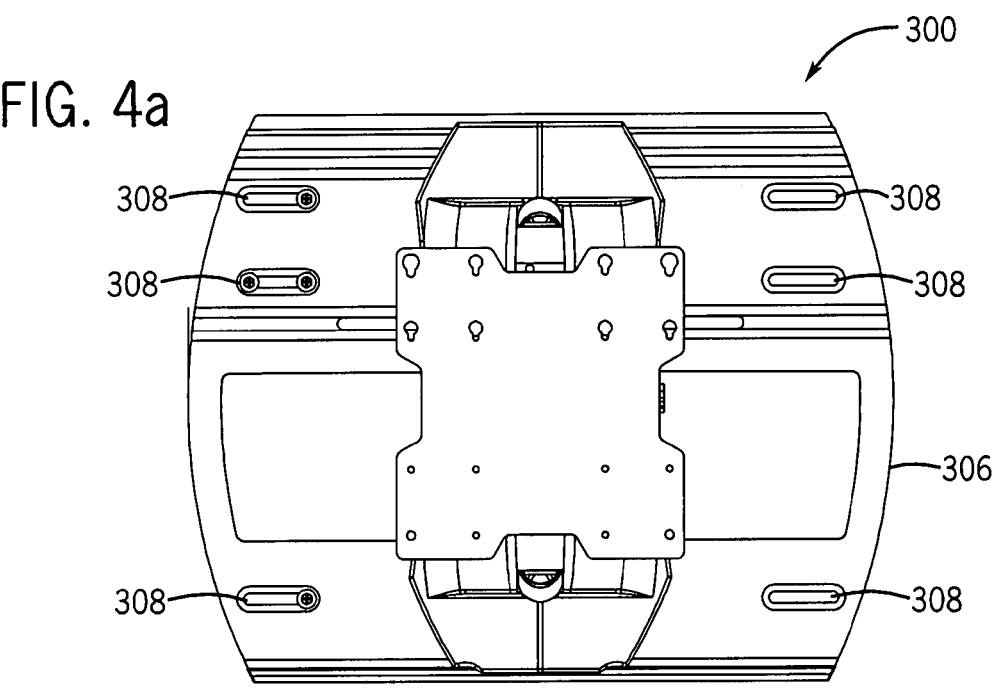
FIG. 4a is an expanded frontal view of a mounting system constructed in accordance with a second embodiment of the present invention.
Figure 4B:
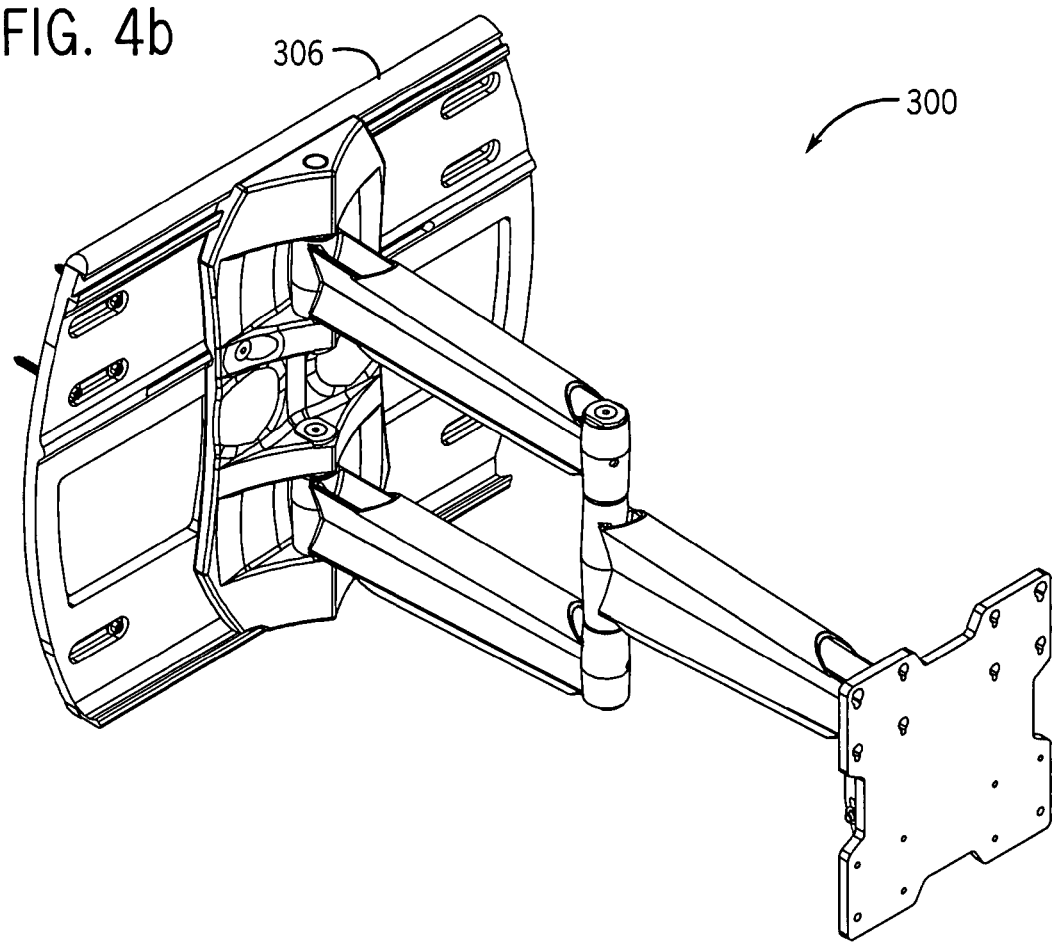
FIG. 4b is a first expanded perspective view of a mounting system constructed in accordance with a second embodiment of the present invention.
Figure 4E:
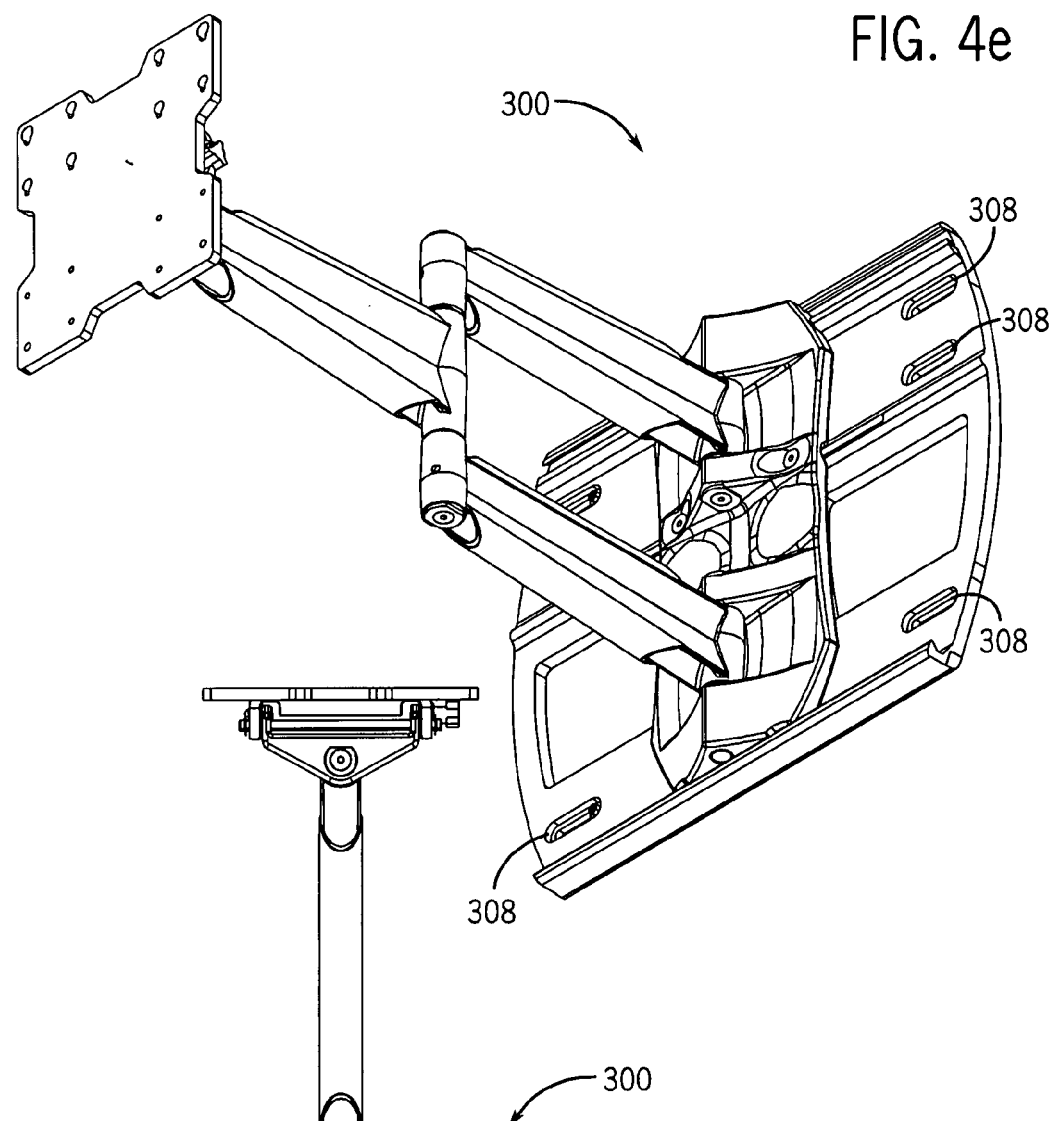
FIG. 4e is a fourth extended perspective view of a mounting system constructed in accordance with a second embodiment of the present invention.
Figure 4F:
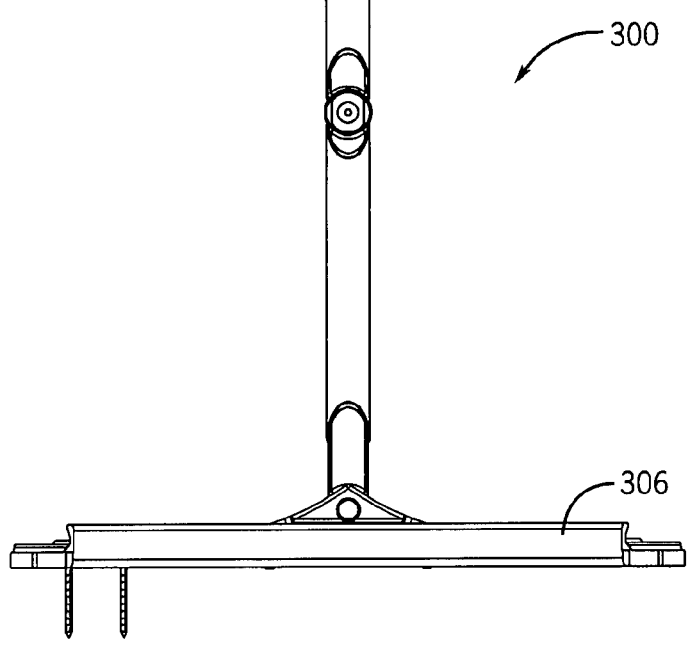
FIG. 4f is an extended bottom view of a mounting system constructed in accordance with a second embodiment of the present invention.
Figure 4G:
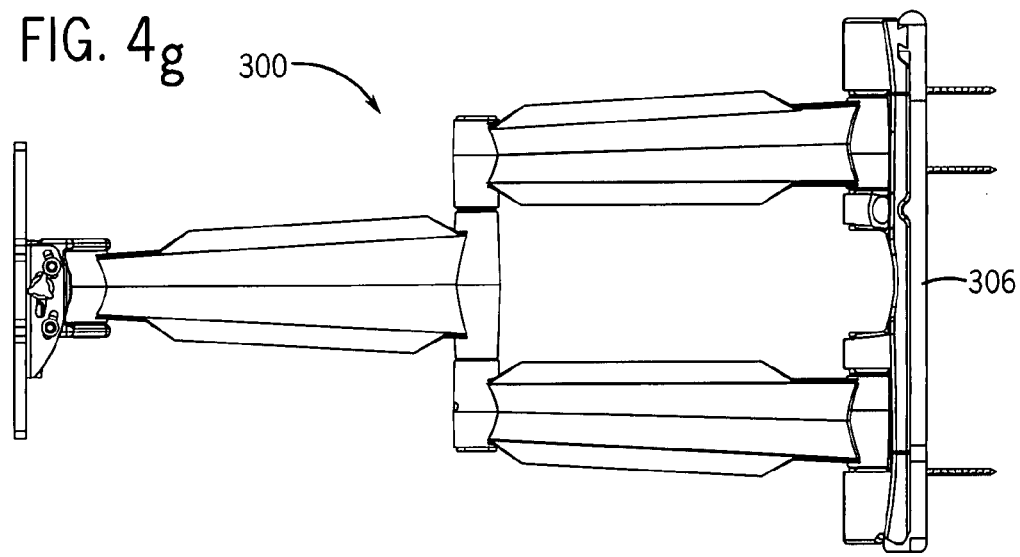
FIG. 4g is a first expanded side view of a mounting system constructed in accordance with a second embodiment of the present invention.
Figure 4H:
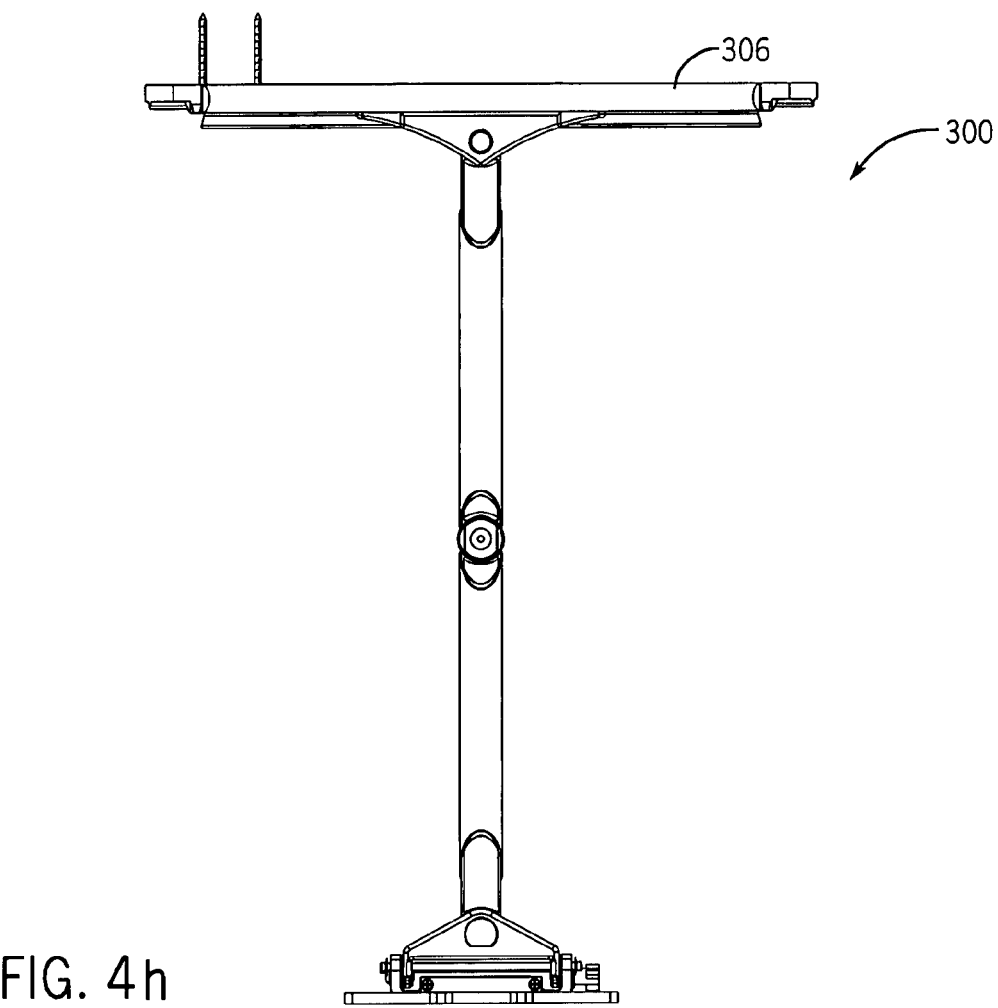
FIG. 4h is an expanded top view of a mounting system constructed in accordance with a second embodiment of the present invention.
Figure 4I:
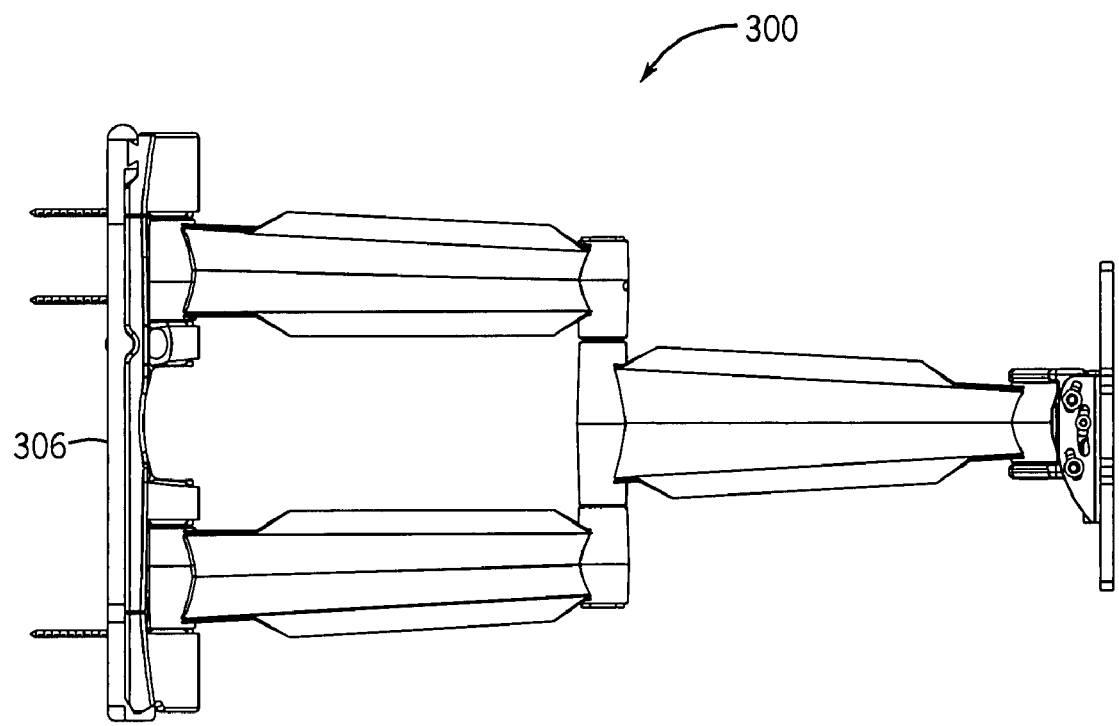
FIG. 4i is a second expanded side view of a mounting system constructed in accordance with a second embodiment of the present invention.

FIGS. 3*a*-4*i* show various collapsed and extended views of a second embodiment of the present invention, where the wall plate 306 is configured to be larger that the wall plate 106 of FIGS. 1*a*-2*i*. This allows a greater horizontal range of movement for the carriage assembly 104. Like the wall plate 106, however, a plurality of elongated slots 308 are formed in the wall plate 306 for allowing the attachment of the mounting system 300 to a wall or other surface, where the plurality of slots 308 are substantially horizontally spaced commensurate with standard wall stud spacing. As seen in FIG. 4*a*, more than one screw per slot 308 can be used to attach the wall plate 306 to a wall or surface. Utilizing more than one screw per slot 308 increases security in keeping the mounting system 300 mounted to the wall or surface. The sliding block 104, wall arms 122, first arm 130, tilt assembly 140 are the same as their counterparts in the first embodiment of the present invention shown in FIGS. 1*a*-2*i*.

Figure 5A:
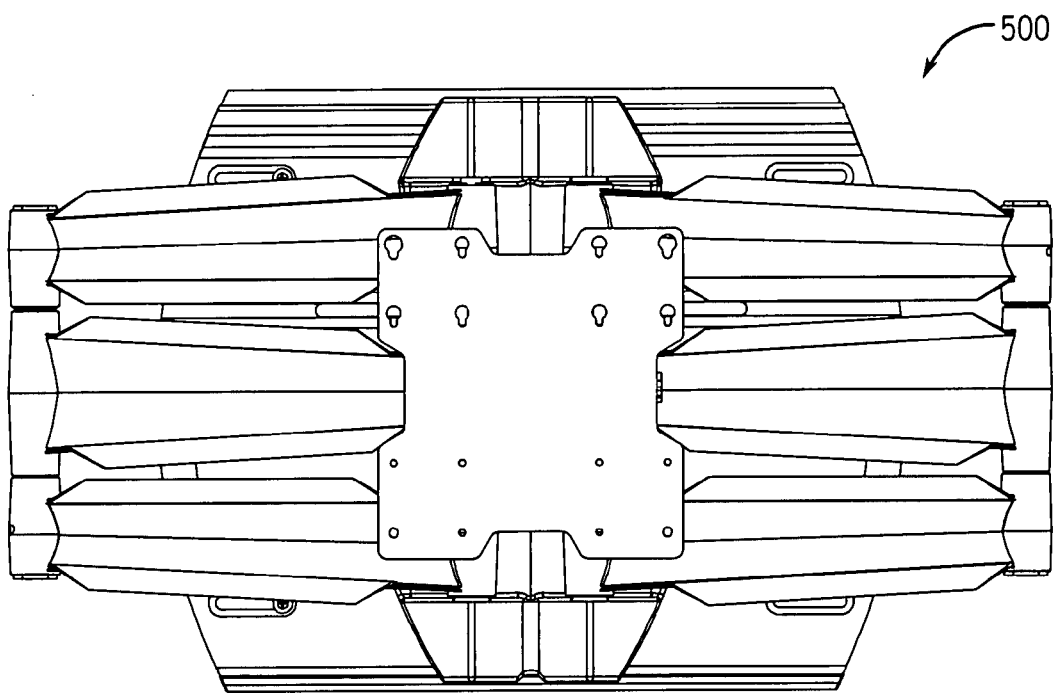
FIG. 5a is a collapsed frontal view of a mounting system constructed in accordance with a third embodiment of the present invention.
Figure 5B:
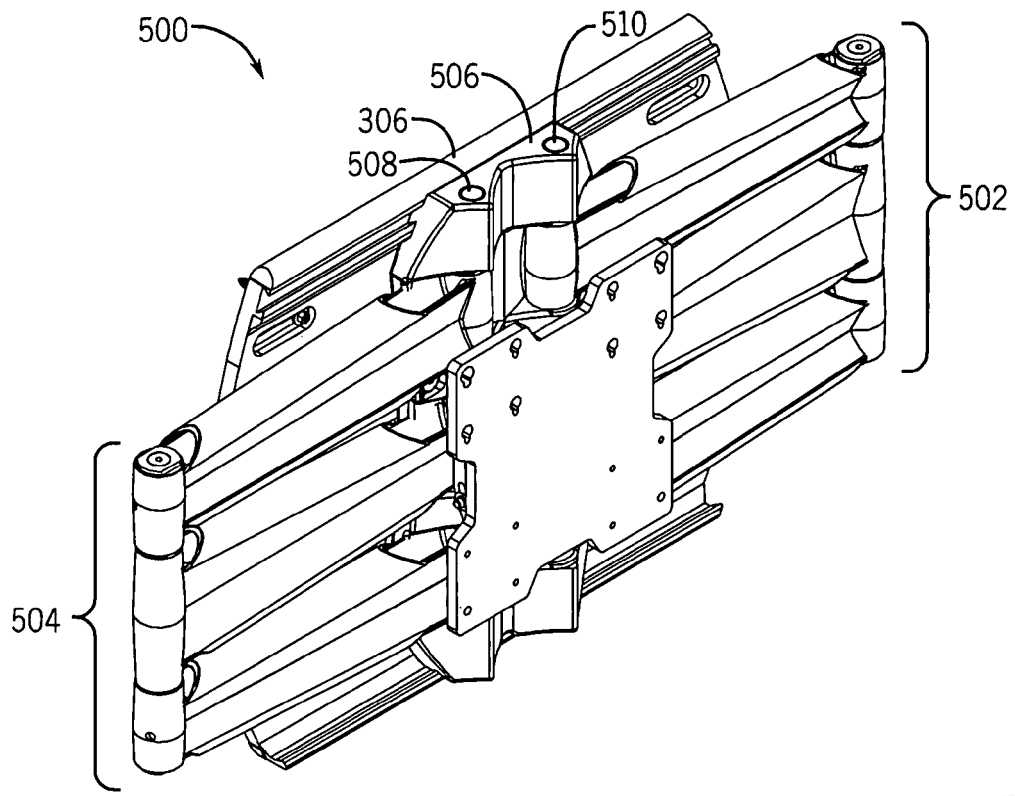
FIG. 5b is a first collapsed perspective view of a mounting system constructed in accordance with a second embodiment of the present invention.
Figures 5E, 5F:
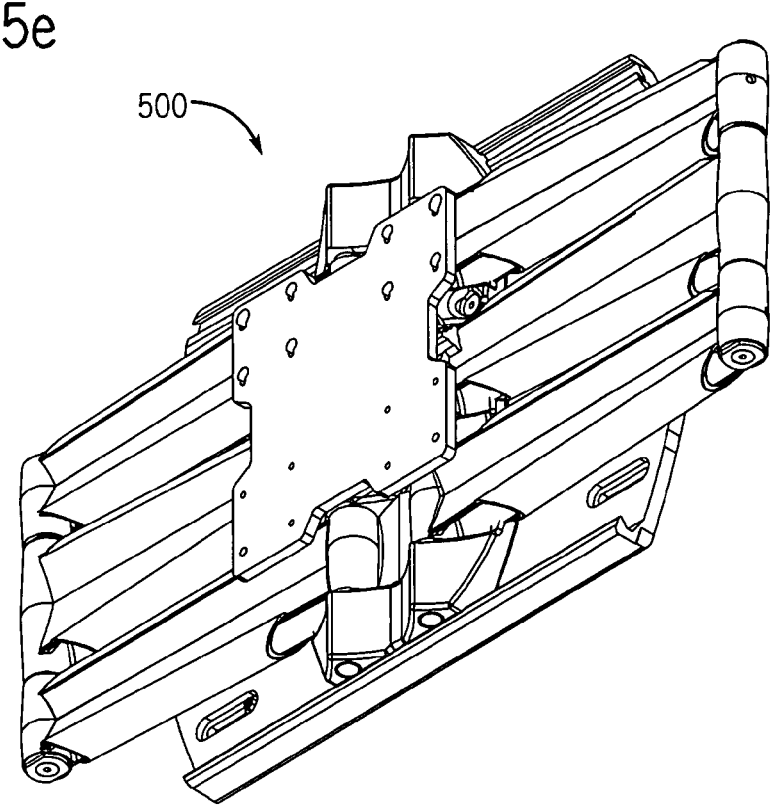
FIG. 5e is a fourth collapsed perspective view of a mounting system constructed in accordance with a third embodiment of the present invention.
FIG. 5f is a collapsed bottom view of a mounting system constructed in accordance with a third embodiment of the present invention.
Figure 5G:
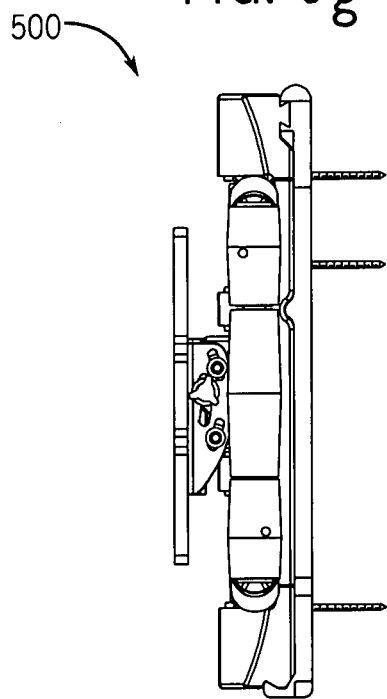
FIG. 5g is a first collapsed side view of a mounting system constructed in accordance with a third embodiment of the present invention.
Figure 5I:
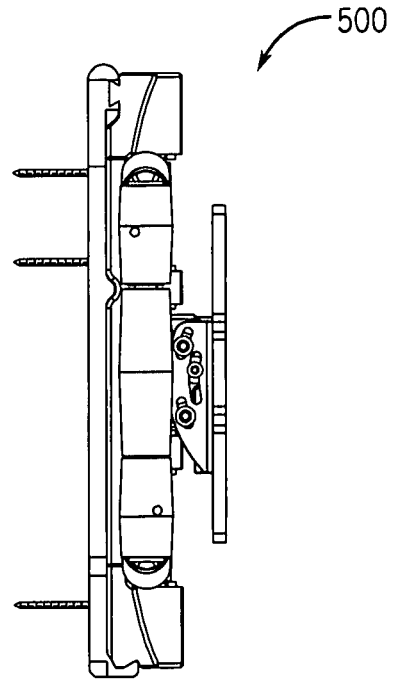
FIG. 5i is a second collapsed side view of a mounting system constructed in accordance with a third embodiment of the present invention.
Figure 5H:
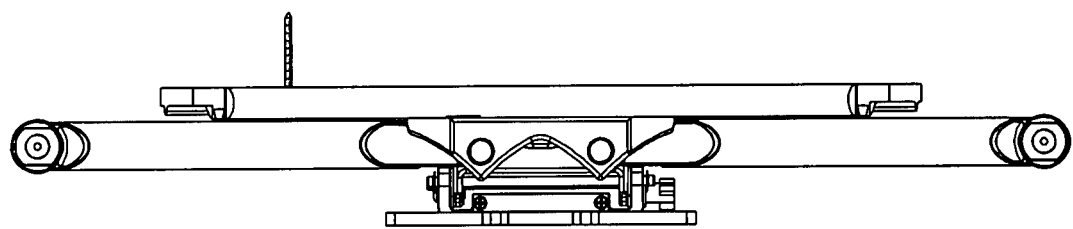
FIG. 5h is a collapsed top view of a mounting system constructed in accordance with a third embodiment of the present invention.
Figure 6A:
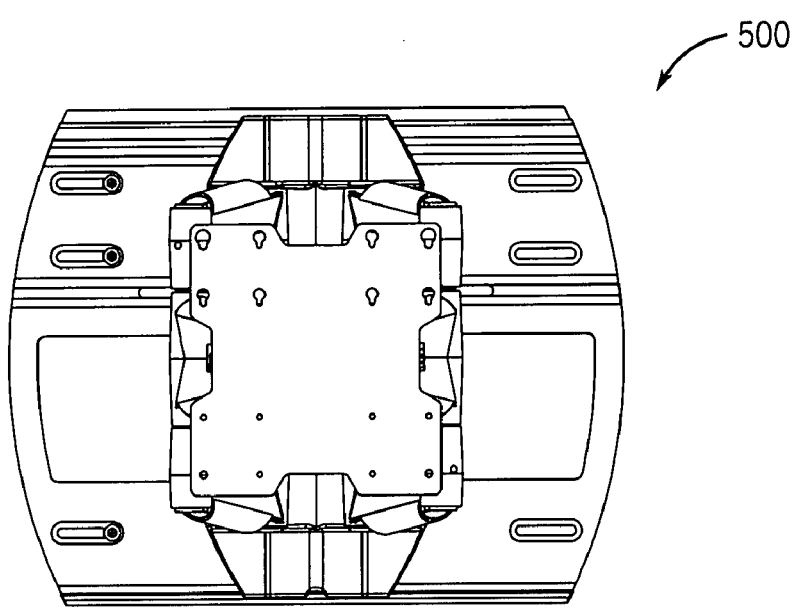
FIG. 6a is an expanded frontal view of a mounting system constructed in accordance with a third embodiment of the present invention.
Figure 6B:
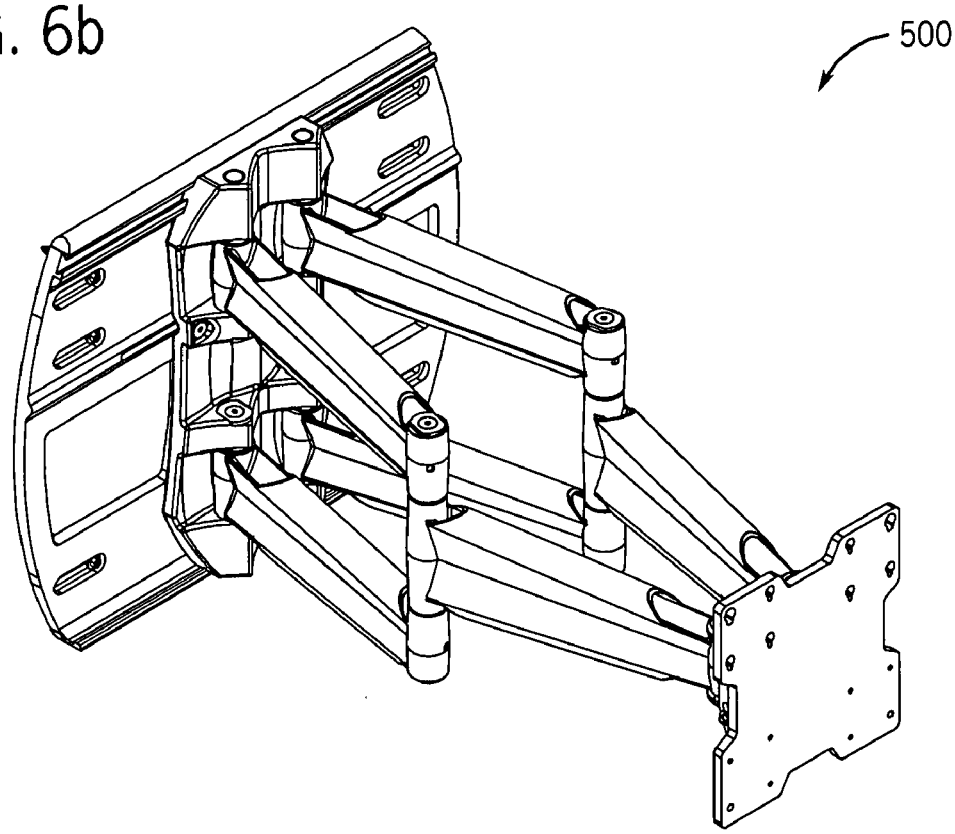
FIG. 6b is a first expanded perspective view of a mounting system constructed in accordance with a third embodiment of the present invention.
Figure 6C:
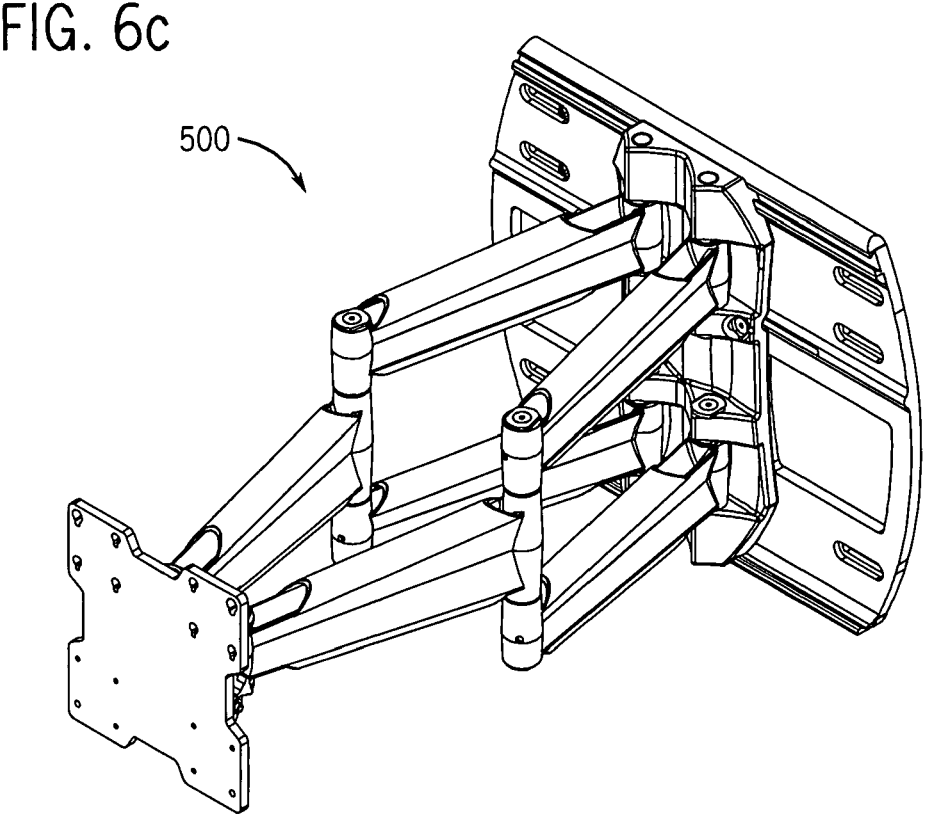
FIG. 6c is a second extended perspective view of a mounting system constructed in accordance with a third embodiment of the present invention.
Figure 6D:
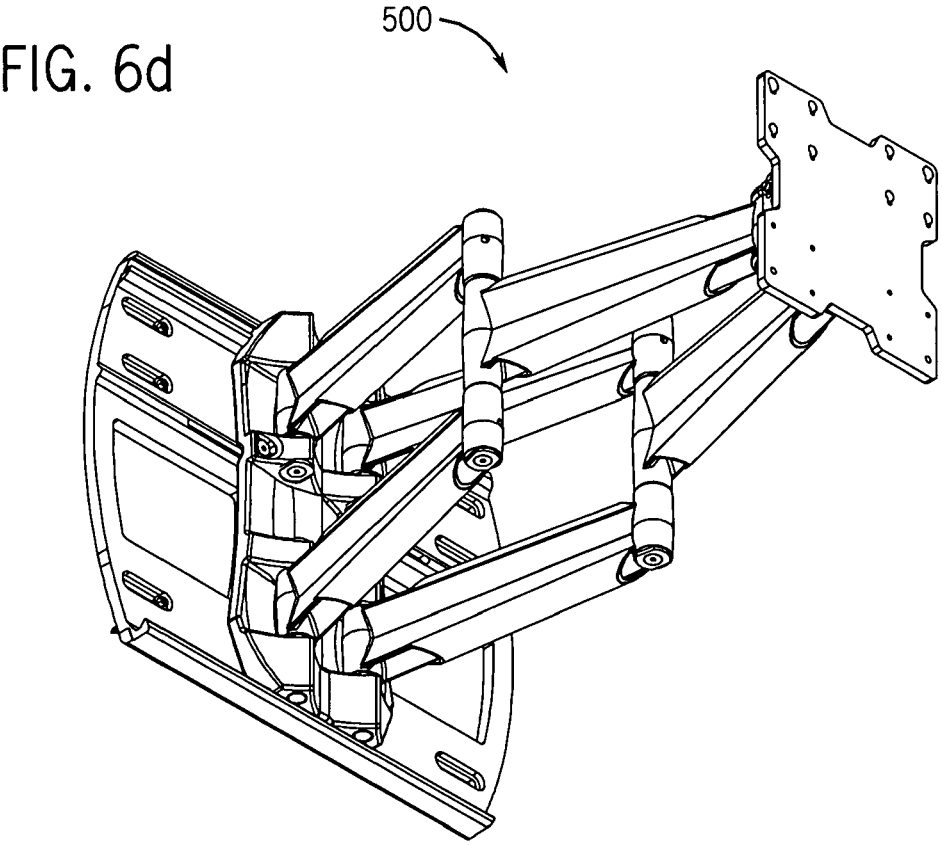
FIG. 6d is a third extended perspective view of a mounting system constructed in accordance with a third embodiment of the present invention.
Figure 6E:
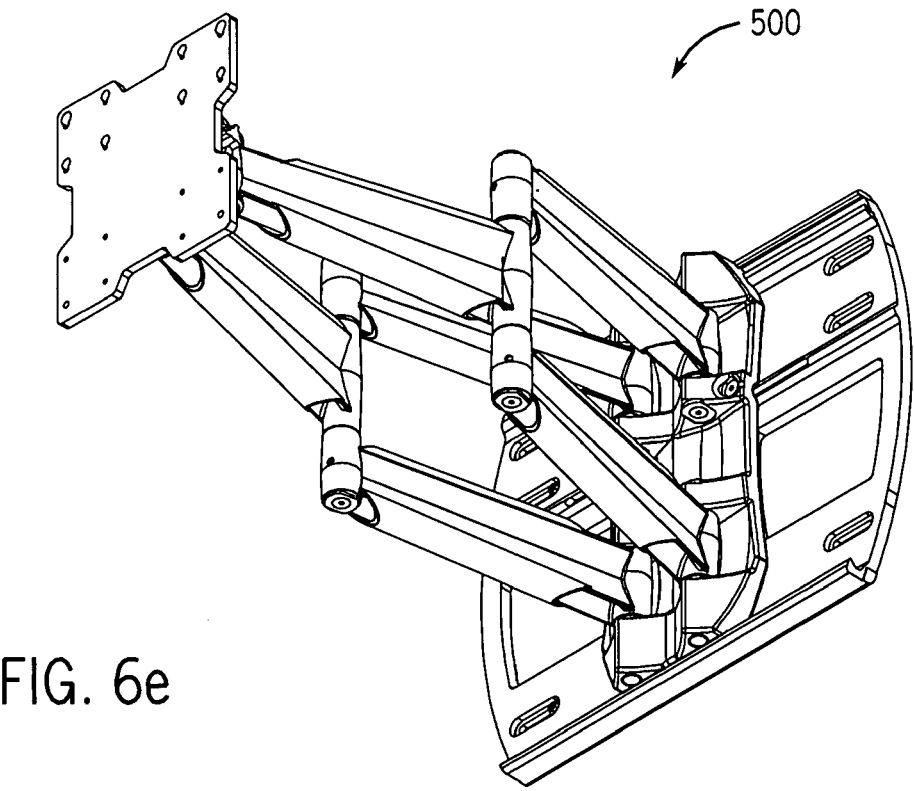
FIG. 6e is a fourth extended perspective view of a mounting system constructed in accordance with a third embodiment of the present invention.
Figure 6F:
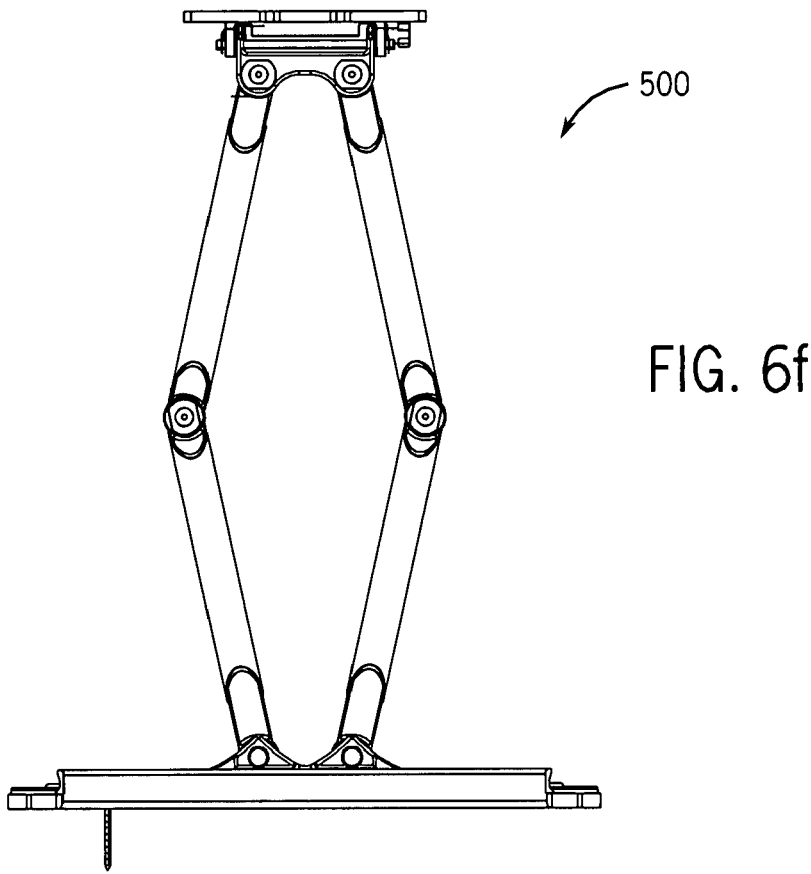
FIG. 6f is an extended bottom view of a mounting system constructed in accordance with a third embodiment of the present invention.
Figure 6G:
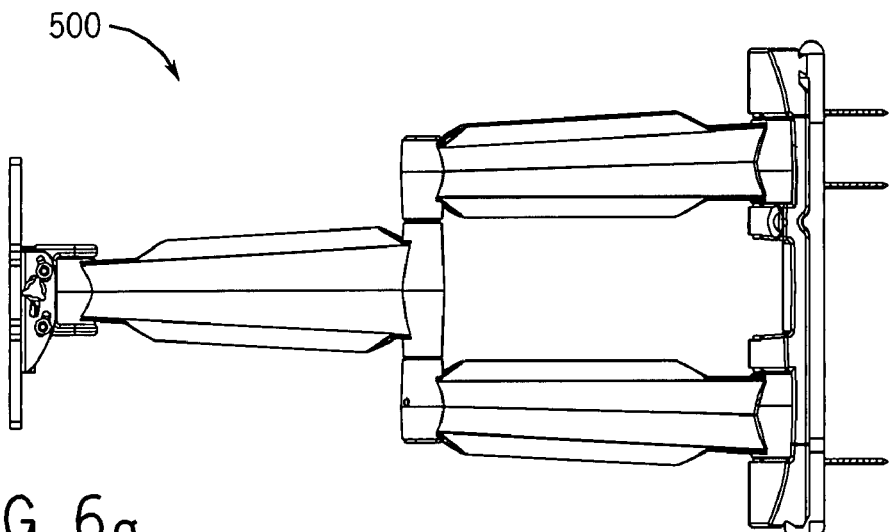
FIG. 6g is a first expanded side view of a mounting system constructed in accordance with a third embodiment of the present invention.
Figure 6H:
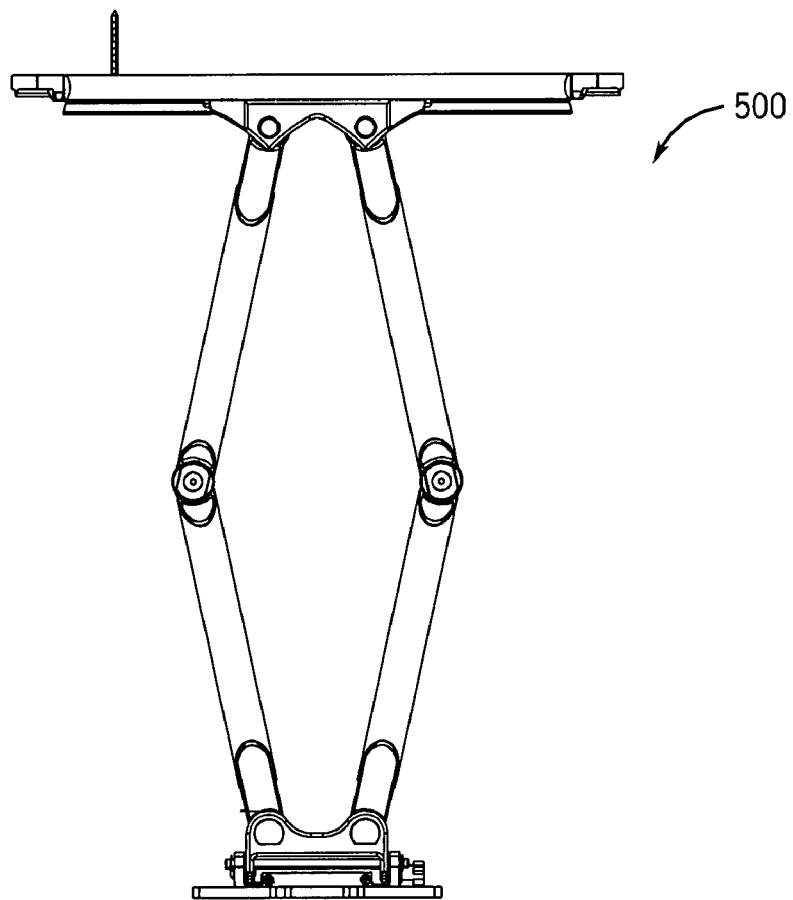
FIG. 6h is an expanded top view of a mounting system constructed in accordance with a third embodiment of the present invention.
Figure 6I:
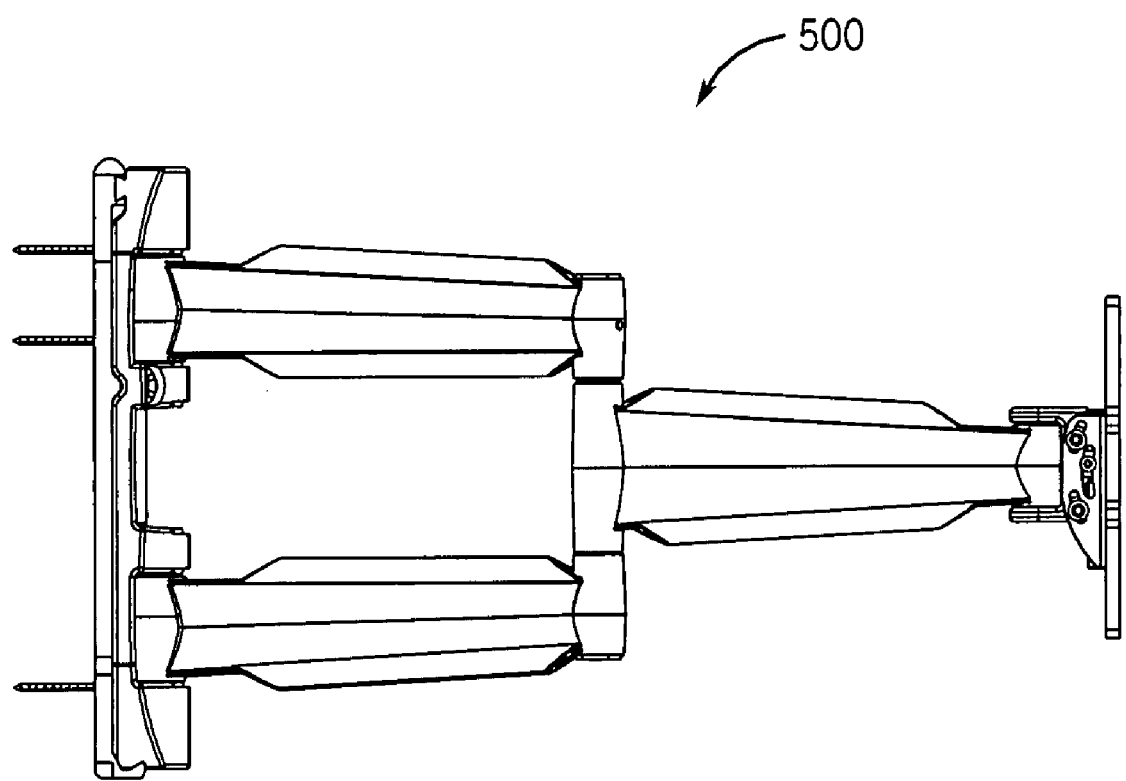
FIG. 6i is a second expanded side view of a mounting system constructed in accordance with a third embodiment of the present invention.

FIGS. 5*a*-6*i* show a third embodiment of the present invention, where a first set 502 comprising wall arms 122 and first arm 130 and a second set 504 comprising another two wall arms 122 and another first arm 130 are operatively connected to sliding block 506. To effect this configuration, two sets of axles, 508 and 510 are utilized to operatively connect the two sets of arms 502 and 504 to the sliding block 506. Operation and adjustment of the mounting system 500 are substantially the same as described above with the single arm set embodiments of the present invention, except the degree of left and right movement around the pivot points of the sliding block 506 may be somewhat hindered as a result of the second set of arms. However, utilizing the two sets of arms 502 and 504, more weight can be supported by the mounting system 500. Additionally, because the weight of a display device mounted to the mounting system 500 is distributed over the two sets of arms 502 and 504, adjusting the mounting system 500 can be accomplished with less effort.

The horizontal adjustment feature of the present invention provides an installer with a very accessible point at which to adjust the horizontal position of a flat panel television or other device that is being mounted. With the horizontal adjustment being located just behind the display device in the various embodiments of the present invention, the installer has an easy point for adjustment, requiring only a simply tool, such as a common hex wrench.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A mounting system for supporting a flat panel display on a wall, comprising:
   a wall plate;
   a carriage assembly slidably engaged with the wall plate;
   first and second arms rotatably connected to the carriage assembly at their respective first ends, wherein the first and second arms are connected by a first axle at their respective second ends distal from the first ends, the first end of each of the first and second arms being rotatably connected to the carriage assembly via an additional axle which is substantially parallel to the first axle;
   a third arm rotatably connected to the first axle at a first end of the third arm, wherein the third arm is positioned to allow rotation of the third arm relative to the respective second ends of the first and second arms; and
   a device mounting assembly operatively connected to a second end of the third arm distal from the first end of the third arm for supporting the flat panel display,
   wherein rotation of the first, second, and third arms relative to the first axle and the carriage assembly result in a first linear adjustment of the first axle substantially perpendicular to an axis defined by the first axle, and sliding of the carriage assembly results in a second linear adjustment of the carriage assembly substantially perpendicular to the axis defined by the first axle.

2. The mounting system of claim 1, wherein the wall plate is securely attached to a surface.

3. The mounting system of claim 2, wherein the carriage assembly comprises a protrusion for slidably engaging a mating guide groove formed on a surface of the wall plate opposite the surface of the wall plate securely attached to the surface.

4. The mounting system of claim 3, wherein the carriage assembly is lockable in a desired position along the mating guide groove using a friction assembly.

5. The mounting system of claim 1, wherein the first and second arms are rotatably connected to the carriage assembly via a pair of axles, each of the pair of axles being inserted within hollow portions of each of the first and second arms at their respective first ends.

6. The mounting system of claim 5, wherein the respective first ends of the first and second arms create a set of pivot points relative to which the first and second arms can rotate substantially 180 degrees relative to the axis defined by the first axle.

7. The mounting system of claim 6, wherein the first and second arms are lockable in a desired position relative to each other and to the carriage assembly using friction screw assemblies at the set of pivot points.

8. The mounting system of claim 1, wherein the respective second ends of the first and second arms create a pivot point allowing the third arm to rotate substantially 360 degrees relative to the first axle.

9. The mounting system of claim 8, wherein the third arm is lockable in a desired position relative to the first and second arms using a friction assembly at the pivot point.

10. The mounting system of claim 1, wherein the device mounting assembly comprises at least two brackets oriented substantially parallel to each other and substantially perpendicular to a device mounting plate.

11. The mounting system of claim 10, wherein the device mounting assembly is adjustable, allowing the device mounting plate to be tilted upwards and downwards about an axis substantially perpendicular to the axis defined by the first axle.

12. The mounting system claim 1, further comprising fourth and fifth arms rotatably connected to the carriage assembly at their respective first ends thereof, wherein the fourth and fifth arms are connected by a second axle at their respective second ends thereof distal from the first ends.

13. The mounting system of claim 12, further comprising a sixth arm rotatably connected to the second axle at a first end of the sixth arm, wherein the sixth arm is positioned to allow rotation relative to the respective second ends of the first and second arms.

14. The mounting system of claim 13, wherein the fourth, fifth, and sixth arms are positioned substantially in parallel with the first, second, and third arms, the third and sixth arms being operatively connected to the device mounting assembly.

* * * * *